United States Patent [19]

Tanaka

[11] Patent Number: 5,140,543
[45] Date of Patent: Aug. 18, 1992

[54] APPARATUS FOR DIGITALLY PROCESSING AUDIO SIGNAL

[75] Inventor: Yoshiaki Tanaka, Fujisawa, Japan

[73] Assignee: Victor Company of Japan, Ltd., Yokohama, Japan

[21] Appl. No.: 510,777

[22] Filed: Apr. 18, 1990

[30] Foreign Application Priority Data

Apr. 18, 1989 [JP] Japan .................................. 1-98125
Apr. 18, 1989 [JP] Japan .................................. 1-98126
Dec. 26, 1989 [JP] Japan .................................. 1-340146

[51] Int. Cl.$^5$ ........................ G06F 7/38; G06F 15/31
[52] U.S. Cl. .............................. 364/736; 364/715.01; 364/724.01
[58] Field of Search ................ 364/200 MS File, 736, 364/715.01, 724.01, 481, 807, 825, 841, 850; 358/43; 340/146.2; 381/29, 51

[56] References Cited

U.S. PATENT DOCUMENTS 4,901,244 2/1990 Szeto ................................. 364/481
4,926,317 5/1990 Wallach et al. .................... 364/736

OTHER PUBLICATIONS

M. Yoritate et al., "A Professional Digital Audio Limiter for CD Mastering Applications," paper presented at the 84th Convention of the Audio Engineering Society, Mar. 1–4, 1988, pp. 1–16.
G. W. McNally, "Digital Audio: Dyamic Range Control of Digital Audio Signals," BBC Research Department Engineering Division paper, Nov. 1983, pp. 1–13.
E. F. Stikvoort, "Digital Dynamic Range Comprressor for Audio," J. Audio Eng. Soc., vol. 34, No. 1/2, Jan.-/Feb. 1986, pp. 3–9.

Primary Examiner—Long T. Nguyen
Attorney, Agent, or Firm—Lowe, Price, Leblanc & Becker

[57] ABSTRACT

A digital signal processing apparatus for digitally performing a limiting or compressing process with respect to an input signal. The apparatus includes a comparator responsive to the input signal inputted through an input terminal of the apparatus for comparing the level of the input signal with a predetermined reference level and a calculation circuit for calculating a function on the basis of the difference between the input signal level and the predetermined reference level when the input signal level is higher than the predetermined reference level. Also included in the apparatus is an adding and subtracting circuit responsive to the output of the calculation circuit and the input signal. The adding and subtracting circuit performs addition or subtraction of the input signal with respect to the output of the calculation circuit representing the calculated function in accordance with whether the input signal is positive or negative. A multiplier multiplies the output of the adding and subtracting circuit by a predetermined gain coefficient and outputs the multiplication result from an output terminal of the apparatus.

11 Claims, 23 Drawing Sheets $g_1 = ATT_1$ $g_2 = ATT_1 \times \dfrac{yc}{Lth_2}$

APPARATUS FOR DIGITALLY PROCESSING AUDIO SIGNAL

BACKGROUND OF THE INVENTION

The present invention relates to a signal processing apparatus which is useful particularly, but not exclusively, for limiting processing or compressing process of a digital audio signal such as a PCM audio signal.

Recently, digital recording/reproduction of an audio signal in systems such as a compact disc, 8-mm VTR (video tape recorder) and a R-DAT (rotary head digital audio tape recorder) is being made for sound-quality augmentation purposes, whereas such systems are under situations to perform analog processing in limiting and compressing an audio signal, thereby resulting in deterioration of the audio signal. In addition, the analog processing can require a multiplicity of filters concurrent with a number of programs which control change and setting of the audio signal characteristic whereby the system becomes complex and costly, and further the use of many filters can cause sound intermission because of taking a long time for switching operation between the filters.

SUMMARY OF THE INVENTION

It is therefore an object of the present invention to provide a signal processing apparatus which digitally performs signal processing so as to prevent the audio signal deterioration and which is capable of surely and quickly perform the setting and change of the audio signal characteristic by use of parameters with one program and preventing the sound intermission.

This and other objects which will become apparent as the description proceeds. Included in a digital signal processing apparatus for digitally performing a limiting or compressing process with respect to an input signal are a comparator and a calculation circuit. The comparator is responsive to the input signal inputted through an input terminal of the apparatus for comparing the level of the input signal with a predetermined reference level. The calculation circuit calculates a function on the basis of the difference between the input signal level and the predetermined reference level when the input signal level is higher than the predetermined reference level. Also included in the apparatus is an adding and subtracting circuit responsive to the output of the calculation circuit and the input signal. The adding and subtracting circuit performs addition or subtraction of the input signal with respect to the output of the calculation circuit representing the calculated function in accordance with whether the input signal is positive or negative. A multiplier multiplies the output of the adding and subtracting circuit by a predetermined gain coefficient and outputs the multiplication result from an output terminal of the apparatus.

For setting and changing the parameters used in the calculation circuit, the apparatus further comprises memory means for storing a plurality of predetermined parameters by which the calculation circuit performs the calculation and buffer means coupled to said memory means and said calculation circuit means. To the buffer means is coupled control means which supplies, during a predetermined time period, a plurality of new parameters to the buffer means so as to be temporarily stored therein when the parameters stored in the memory means are changed to the new parameters. The new parameters are supplied from the buffer means to the memory means and further to the calculation circuit which in turn performs the process in accordance with the new parameters.

BRIEF DESCRIPTION OF THE DRAWINGS

The object and features of the present invention will become more readily apparent from the following detailed description of the preferred embodiments taken in conjunction with the accompanying drawings in which:

FIG. 22(a), 22(b), 22(c), 22(d), 22(c'), 22(d'), 22(e) form a timing chart for describing a parameter setting and changing operation;

DETAILED DESCRIPTION OF THE INVENTION

Figure 1:
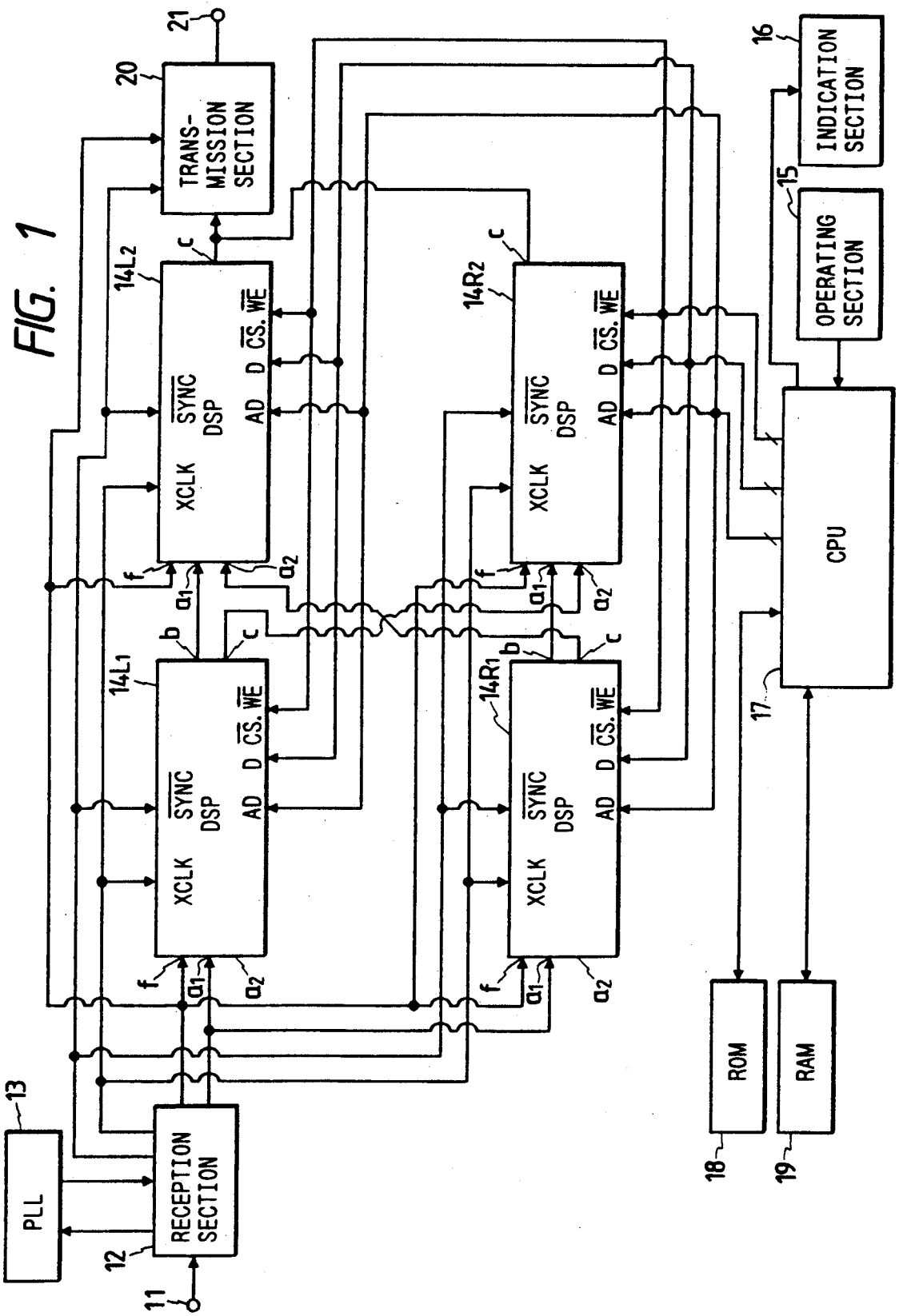
FIG. 1 is a block diagram showing an arrangement of a digitally processing apparatus for an audio signal according to the present invention.

Referring now to FIG. 1, there is illustrated an arrangement of an apparatus for digitally processing an audio signal according to the present invention. In FIG. 1, illustrated at numeral 12 is a reception section which is for demodulating to a NRZ (nonreturn-to-zero) signal (for example) a digital data signal (for example, a modulated stereophonic signal from an external device such as a CD player) inputted through an input terminal 11. That is, according to the so-called self-clock system, the reception section 12 extracts a clock component from the received data signal and supplies it to a PLL (phase-locked loop) circuit 13 so as to successively produce clock pulses in synchronism with the supplied clock components which clock pulses are returned to the reception section 12. The reception section 12 performs the demodulation of the received data signal in synchronism with the returned clock pulses, the demodulated data signal being fed to input terminals al of first and second digital signal processors (DSP) 14L1 and 14R1. The first and second digital signal processors 14L1 and 14R1 equalize the left-channel audio signal and right-channel audio signal of a stereophonic signal, respectively, through the FIR (finite impulse response) digital filter operation. The respective results due to the equalization are outputted from output terminals b thereof so as to be supplied as data signals to input terminals al of third and fourth digital signal processors 14L2 and 14R2 and further outputted from output terminals b so as to be fed as data signals to input terminals a2 of the fourth and third digital signal processors 14R2 and 14L2. The reception section 12 generates a synchronizing clock (bit clock) which is in turn supplied to input terminals f of the respective digital signal processors (each of which will be referred hereinafter to as processor) 14L1 to 14R2. The third and fourth processors 14L2 and 14R2 perform a limiting process or compressing process with respect to the inputted left-channel signal and right-channel signal, respectively. The output data signals of the third and fourth processors 14L2 and 14R2 are supplied through output terminals c thereof to a transmission section 20 which in turn performs a modulation (for example, biphase modulation) with respect to the output data signals so as to form a format suitable for transmission. The modulated data signals are serially outputted through an output terminal 21 thereof toward an external circuit (for example, digital amplifier), not shown. Further, the reception section 12 supplies a system clock XCLK, a synchronizing signal (sampling clock) SYNC and others, necessary for processing, to the first to fourth processors 14L1 to 14R2.

Also included in this audio signal processing apparatus is an operating section 15 having a plurality of push-button switches (not shown) so as to be operated to obtain desirable equalizer characteristic or limiter characteristic. The operating section 15 is coupled to a CPU (central processing unit) 17 which in turn controls an indication section 16 comprising a CRT (cathode-ray tube), lamps, LEDs (light-emitting diodes) and others and, in addition, controls the first to fourth processors 14L1 to 14R2 so as to realize desirable characteristics in accordance with programs prestored in a ROM (read-only memory) 18. The CPU 17 is also coupled to a RAM (random access memory) 19 to temporarily store necessary data thereto and read out the data therefrom.

Figure 2:
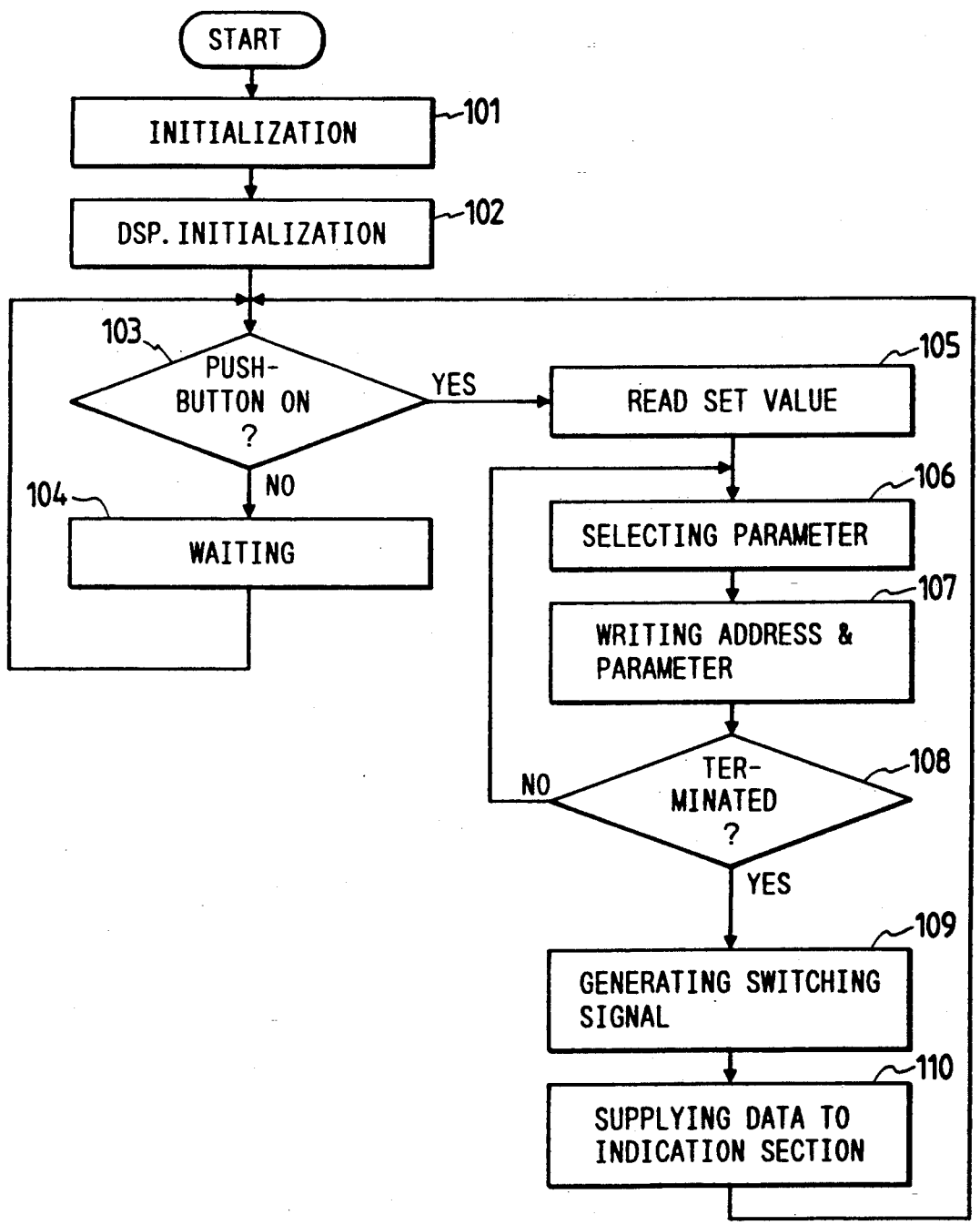
FIG. 2 is a flow chart for describing an operation of a CPU in the FIG. 1 electronic unit.

FIG. 2 shows a flow chart representing one example of control to be executed by the CUP 17 in accordance with a predetermined program. In FIG. 2, the control starts with a step 101 for initialization of the CPU 17, then followed by a step 102 for initialization of the processors 14L1 to 14R2. Thereafter, the control advances to a step 103 in order to check the operating state (ON state) of the plurality of push-button switches in the operating section 15. Here, in the case of no operation, the control goes to a step 104 to repeatedly assume a waiting attitude for a predetermined time period. On the other hand, when the push-button switches are in the ON state, a step 105 follows to read a set value determined by the operation of the push-button switches. After the execution of the step 105, a step 106 is executed to select one of signal-processing parameters prestored in the ROM 18 which one corresponds to the set value, and a step 107 is then executed to write the selected parameter, together with address information, into parameter memories 79 (which will be described hereinafter with reference to FIG. 7) built in the respective processors 14L1 to 14R2. The completion of the parameter-writing is checked in the next step 108. In response to the parameter-writing completion, the control proceeds to a step 109 in which the CPU 17 generates a switching signal AD, subsequently followed by a step 110 to supply data to the indication section 16.

Figure 3:
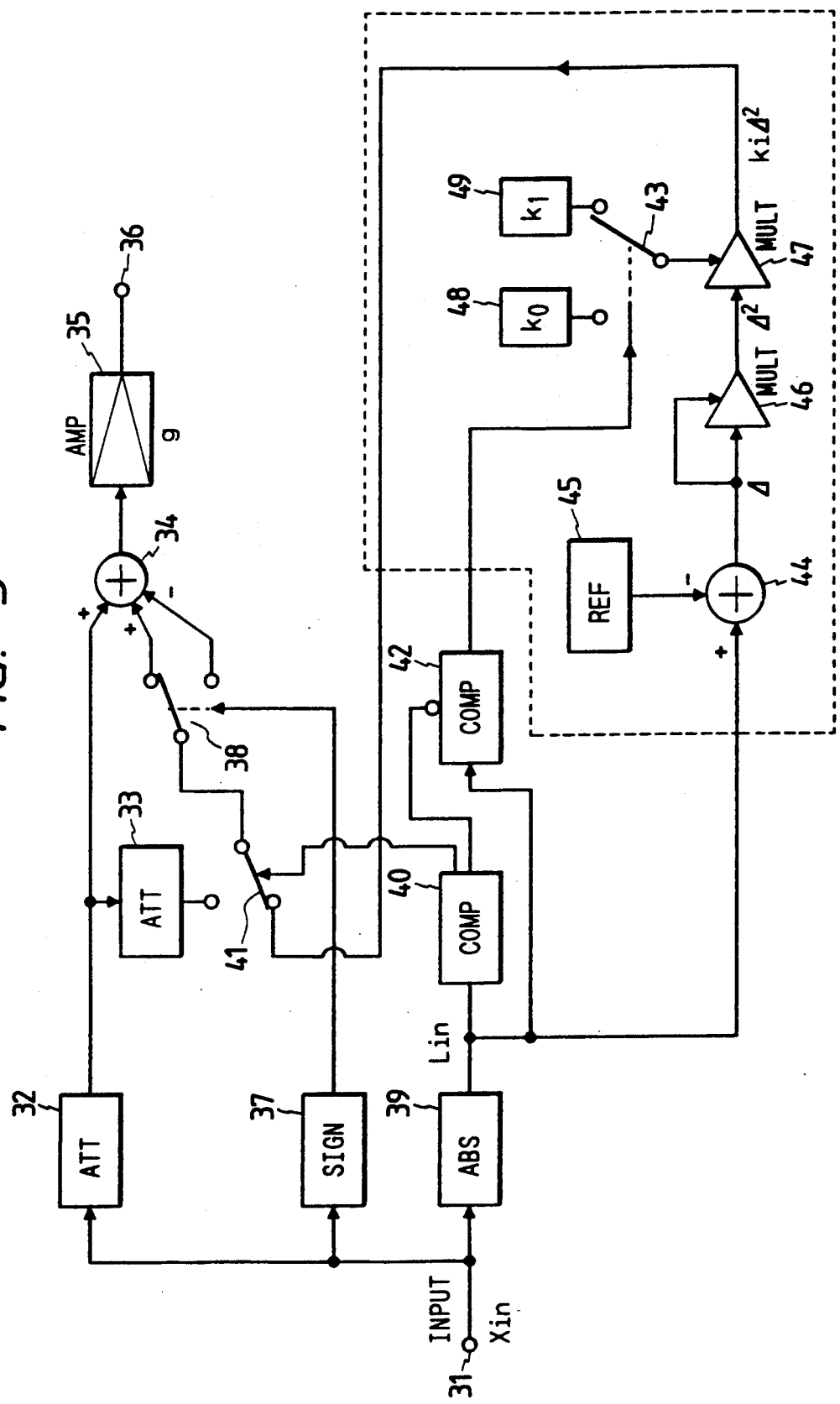
FIG. 3 is a block diagram for describing a limiting or compressing process according to a first embodiment of this invention.

FIG. 3 is a block diagram for describing a limiting process or a compressing process according to a first embodiment of this invention which is executed in the processor 14L2 or 14R2 in FIG. 1 digital signal processing apparatus. In FIG. 3, an input signal (digital data) Xin inputted through an input terminal 31 is led to a first attenuator (ATT) 32 so as to be attenuated by a predetermined level, and the output signal of the first attenuator 32 is supplied to an adding and subtracting circuit 34 and further to a second attenuator (ATT) 33 so as to be additionally attenuated by a predetermined level. The output side of the second attenuator 33 is coupled to a first switch 41 and the output signal of the adding and subtracting circuit 34 is supplied through an amplifier (AMP) 35 whose gain is g to an output terminal 36.

Figure 4:
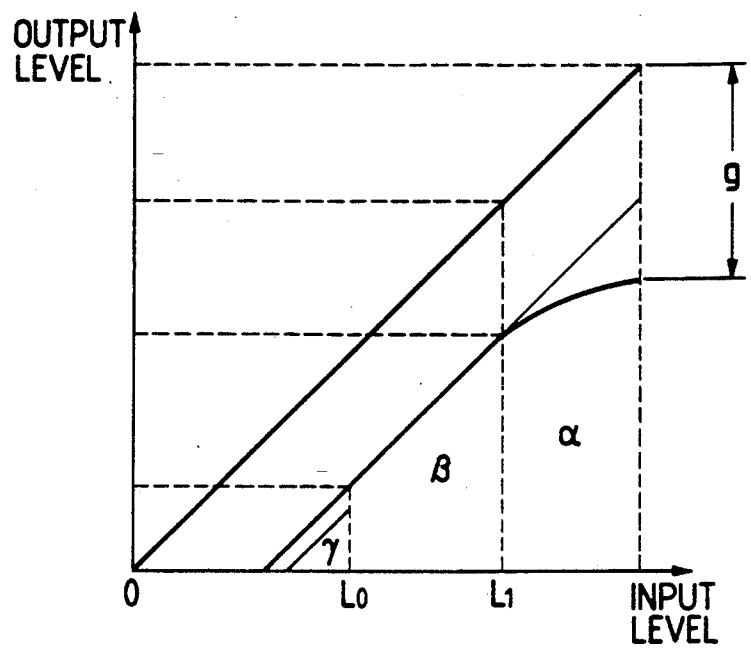
FIG. 4 is a graphic diagram showing input/output characteristics.

Further, the input signal Xin is fed to an absolute circuit (ABS) 39 to detect the absolute value Lin of the level of the input signal Xin. The output signal of the absolute circuit 39, which represents the absolute level Lin, is led to a first comparator (COMP) 40 so as to be compared with a reference value Lo. When the absolute level Lin is lower than the reference value Lo, the comparator 40 operates a second comparator 42 to be set into the deenergized state and further operates the movable contact of the first switch 41 to the upper side in FIG. 3 so that the output side of the second attenuator 33 is coupled through the first switch 41 to a second switch 38 which is coupled to the adding and subtracting circuit 34. The input signal Xin is also inputted to a sign decision circuit (SIGN) 37 which checks the sign (polarity) of the input signal Xin so as to perform the switching operation of the second switch 38 in accordance with the sign (positive or negative) of the input signal Xin. That is, the movable contact of the second switch 38 is operated to be connected with the lower side fixed contact in the Figure when the input signal Xin is positive, and on the other hand operated to be connected with the upper side fixed contact in the Figure when the input signal Xin is negative, whereby the adding and subtracting circuit 34 outputs the difference between the outputs of the first and second attenuators 32 and 33 under the condition that the absolute level Lin is lower than the reference level Lo. Here, the attenuation amounts of the first and second attenuators 32 and 33 are adjusted so that the output of the adding and subtracting circuit 34 appropriately assumes a small value, and therefore the level of the signal outputted from the output terminal 36 through the amplifier 35 substantially becomes zero. In this case, the output characteristic corresponds to a $\tau$ region (signal non-passing region) in FIG. 4. In other words, since the level of the input signal is low, the output is gated as a noise.

The output signal of the absolute circuit 39 is also supplied to the second comparator 42 and further to a subtracter 44 which is in turn connected to a first multiplier 46 which squares the value of its input signal, the output side of the first multiplier 46 being coupled to a second multiplier 47 which multiplies the value of its input signal by a predetermined coefficient.

Returning again to the comparator 40, when the absolute level Lin of the input signal Xin is higher than the reference level Lo, the comparator 40 operates the movable contact of the switch 41 to be changed so as to be connected with the lower side fixed contact in the Figure so that the second switch 38 is coupled through the first switch 41 to the output side of the second multiplier 47, and further operates the second comparator 42 to enter into the energized state. The second comparator 42 compares the absolute level Lin with another reference level L1 (Lo<L1). When lower than the reference level L1 (Lo<Lin<L1), the second comparator 42 operates the movable contact of a third switch 43 so as to take the left side fixed contact in the Figure so that a coefficient circuit 48 whose coefficient is ko is coupled through the third switch 43 to the second multiplier 47. The coefficient ko of the coefficient circuit 48 is set to be zero and hence the output level of the second multiplier 47 becomes zero. In this case, the adding and subtracting circuit 34 results in outputting the output of the first attenuator 32 as it is. The output characteristic corresponds to a region $\beta$ (linear region) in FIG. 4.

On the other hand, when the absolute level Lin is equal to or higher than the reference level L1 (Lin$\geq$L1), the movable contact of the switch 43 is switched to be connected with the right side fixed contact in the Figure so that the second multiplier 47 is coupled to another coefficient circuit 49 whose coefficient is k1. Thus, the second multiplier 47 multiplies its input signal (the output signal of the first multiplier 46) $\Delta^2$ by the coefficient k1 to output a signal k1$\Delta^2$.

The subtracter 44 is responsive to a reference level Lth (=the reference level L1) from a reference level generating circuit (REF) 45 so as to output the difference (Lin−Lth=$\Delta$) between the absolute level Lin and the reference level Lth. The first multiplier 46 squares the difference $\Delta$ and supplies the output signal to the second multiplier 47, the output signal (k1$\Delta^2$) of which is supplied through the first and second switches 41 and 38 to the adding and subtracting circuit 34.

The adding and subtracting circuit 34 subtracts the output of the second multiplier 47 from the output of the first attenuator 32 when the input signal Xin is positive and adds the output of the second multiplier 47 to the output of the first attenuator when the input signal Xin is negative. The output of the adding and subtracting circuit 34 is amplified by the amplifier 35 and outputted through the output terminal 36. In this case, the output characteristic corresponds to a region $\alpha$ (nonlinear region) in FIG. 4. As obvious from FIG. 4, the input signal results in being compressed or limited when outputting.

Figure 5:
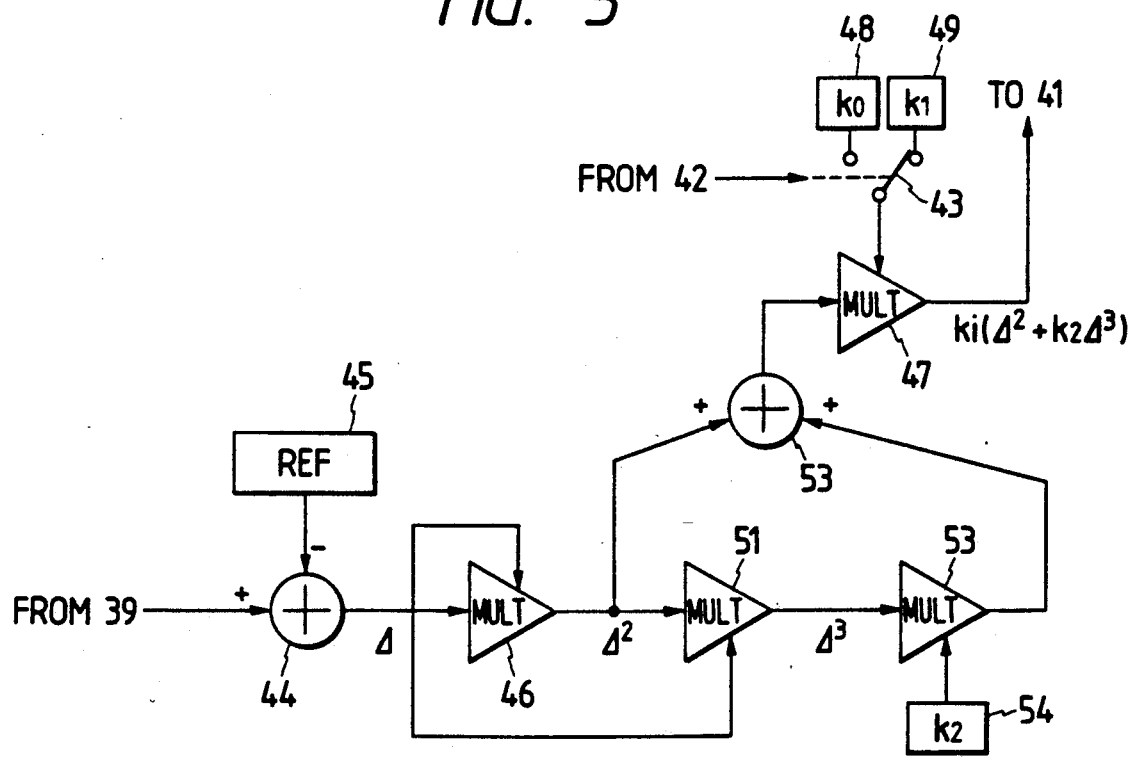
FIG. 5 is a block diagram showing a circuit arrangement for describing a second embodiment of this invention.

FIG. 5 is a circuit diagram for describing a second embodiment of this invention. Since the second embodiment differs from the first embodiment in terms of a portion encircled by a dotted line in FIG. 3, FIG. 5 illustrates only the corresponding circuit arrangement where parts corresponding to those in FIG. 3 are marked with the same numerals and characters, and the description thereof will be omitted for brevity. In FIG. 5, one difference between the first embodiment and second embodiment is that there are further provided are third and fourth multipliers 51 and 52 and an adder 53 between a first multiplier 46 and a second multiplier 47. The third multiplier 51 is arranged to be responsive to the output $\Delta$ of a subtracter 44 and the output $\Delta^2$ of the first multiplier 46 so as to multiply $\Delta$ by $\Delta^2$ to produce the output $\Delta^3$. The output $\Delta^3$ is supplied to the fourth multiplier 52 which is coupled to a coefficient circuit 54, whose coefficient is k2, so as to multiply the output $\Delta^3$ by the coefficient k2. The output k2$\Delta^3$ of the fourth multiplier 52 is fed to the adder 53 which adds the output k2$\Delta^3$ to the output $\Delta^2$ of the first multiplier 46 and supplies the result $\Delta^2$+k2$\Delta^3$ to the second multiplier 47. The second multiplier 47 multiplies the output $\Delta^2$+k2$\Delta^3$ by the coefficient ki (k0 or k1) to produce the output as ki($\Delta^2$+k2$\Delta^3$) which is supplied to a first switch 41. This circuit arrangement can further enhance the compressing (or limiting) characteristic in the region $\alpha$ of FIG. 4 as compared with the above-described first embodiment.

Figure 6:
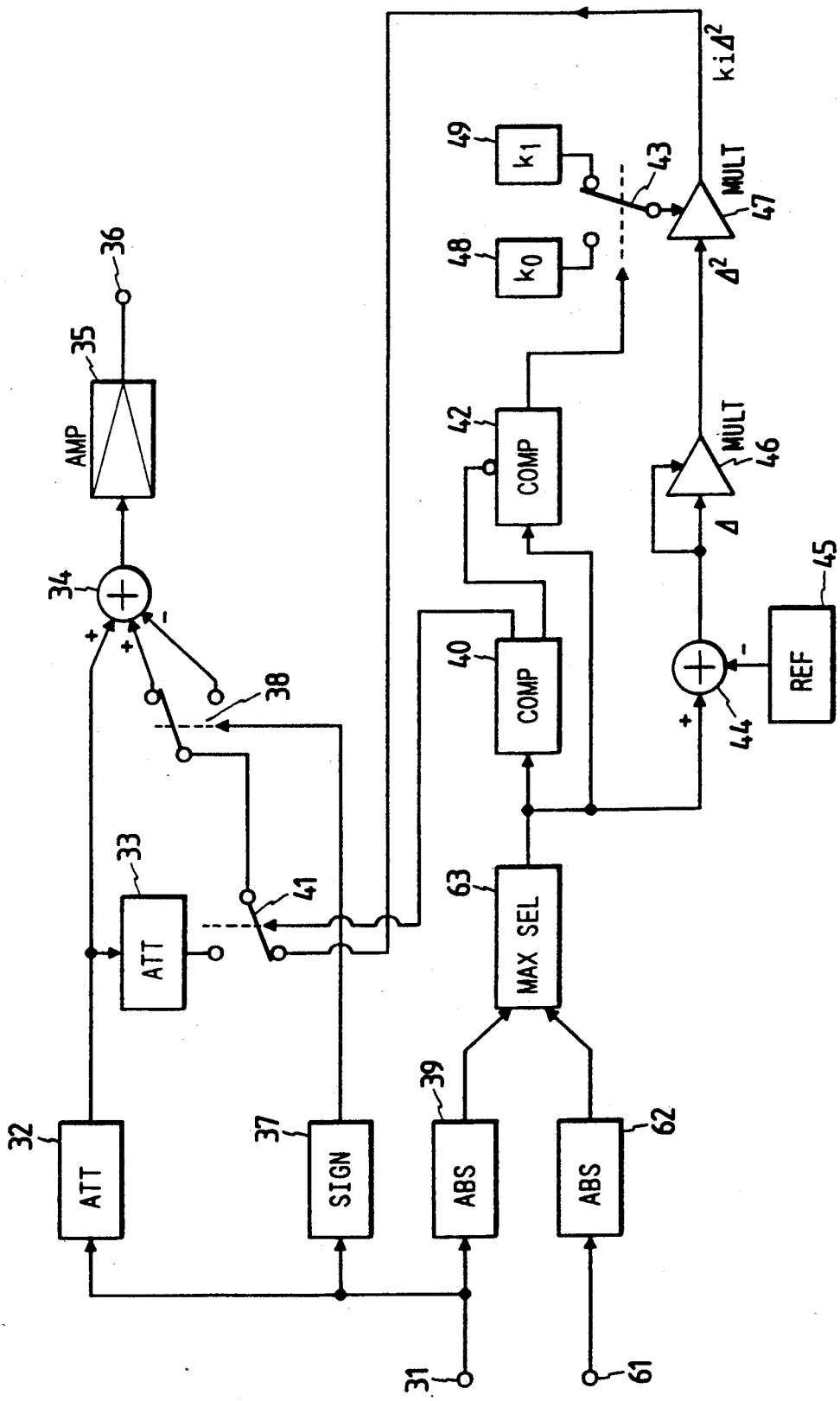
FIG. 6 is a block diagram showing an circuit arrangement for describing a third embodiment of the invention.

FIG. 6 is a circuit diagram for describing a third embodiment of the present invention in which parts corresponding to those in FIG. 3 are marked with the same numerals and characters, and the description thereof will be omitted for brevity. In FIG. 6, the difference between the first embodiment and the third embodiment is that there are additionally provided another absolute circuit 62 and a maximum-value selection circuit (MAXSEL) 63. The absolute circuit 62 is arranged to be responsive to an input signal fed through an input terminal 61, the output signal representing the absolute value of the input signal being supplied to the maximum-value selection circuit 63 which is also responsive to the output signal of an absolute circuit 39. The maximum-value selection circuit 63 selects the greater one of the outputs of the absolute circuits 39 and 62 and outputs the selection result to comparators 40, 42 and subtracter 44. In this embodiment, the input terminals 31 and 61 correspond to the input terminals a1 and a2 of the processors 14L3 and 14R2, respectively. According to this embodiment, even if the levels of the left and right channel signals are extremely different from each other, it is possible to prevent the affection of one channel signal to the other channel signal.

Figure 7:
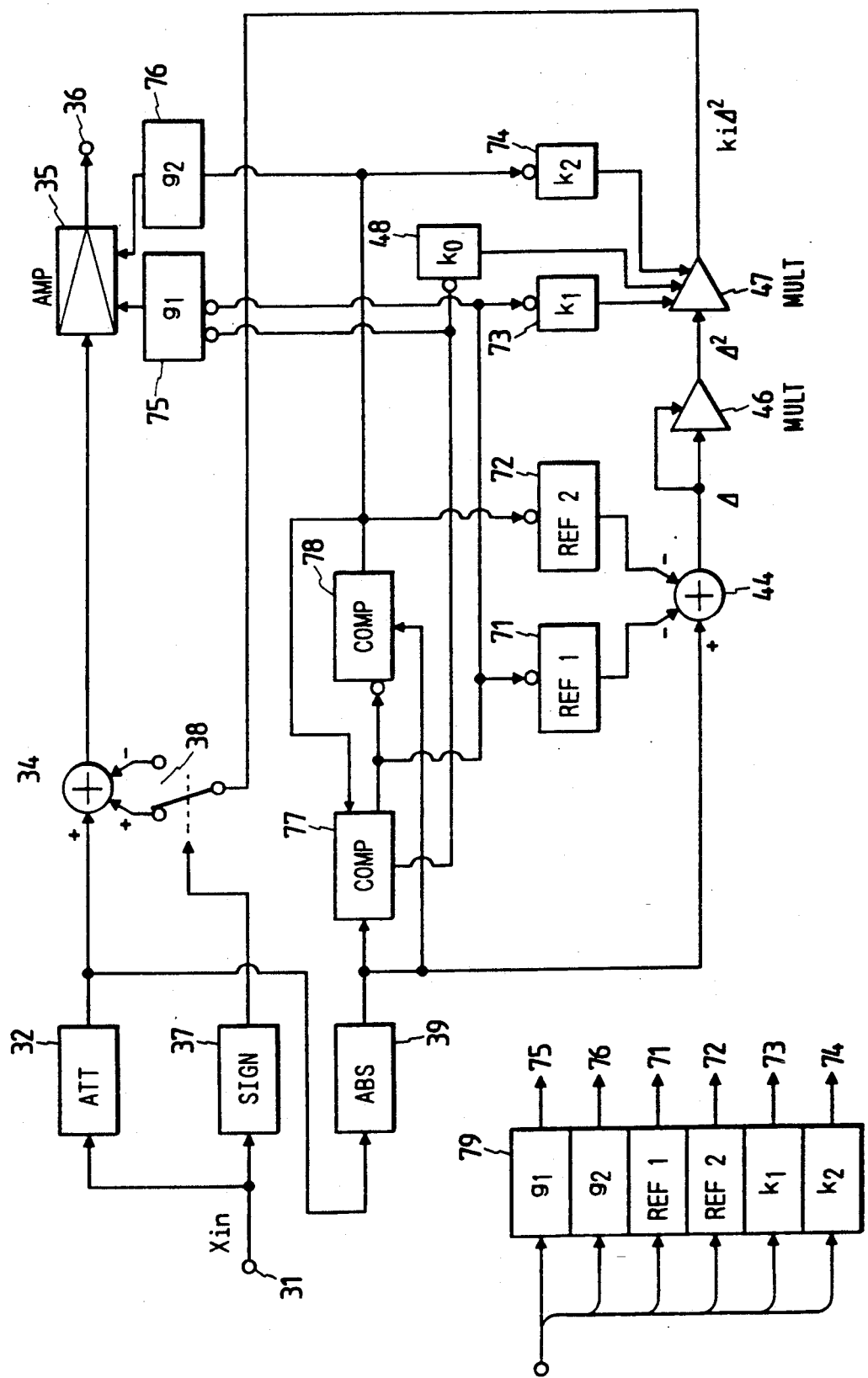
FIG. 7 is a block diagram showing an circuit arrangement for describing a fourth embodiment of the invention.

FIG. 7 is a circuit diagram for describing a fourth embodiment of this invention in which parts corresponding to those in FIG. 3 are marked with the same numerals and characters and the description thereof will be omitted for brevity In FIG. 7, an input signal Xin is led through an input terminal 31 to an attenuator (ATT) 32 and further to a sign decision circuit (SIGN) 37. The output signal of the attenuator 32 is supplied to an adding and subtracting circuit 34 the output of which is supplied through an amplifier (AMP) 35 to an output terminal 36, and the output signal of the sign decision circuit 37 is fed to a switch 38 so as to be switchable in accordance with the sign of the input signal Xin. The amplifier 35 performs the amplification in accordance with gain coefficients g1 and g2 from coefficient circuits 75 and 76. The output signal of the attenuator 32 is also supplied to an absolute circuit (ABS) 39 the output of which is fed to a first comparator (COMP) 77 and further to a second comparator 78, in which the absolute level Lin outputted from the absolute circuit 39 is compared with reference levels L11 and L12 (L11<L12).

Further, the output signal of the absolute circuit 39 is supplied to a subtracter 44 which outputs the difference $\Delta$ between the absolute level Lin from the absolute circuit 39 and a reference level REF1 or REF2 from a reference level generating circuit 71 or 72. The output $\Delta$ of the subtracter 44 is supplied to a first multiplier 46 the output $\Delta^2$ of which is fed to a second multiplier 47. The second multiplier 47 is coupled to coefficient circuits 48, 73 and 74 whose coefficients are ko, k1 and k2, respectively. A parameter memory 79 stores parameters including the reference levels REF1, REF2 and the coefficients k1, k2, g1 and g2 determined in accordance with operation of the operating section 15 in FIG. 1 and supplies them to the reference level generating circuits 71, 72 and the coefficient circuits 73 to 76, respectively.

Figure 8A:
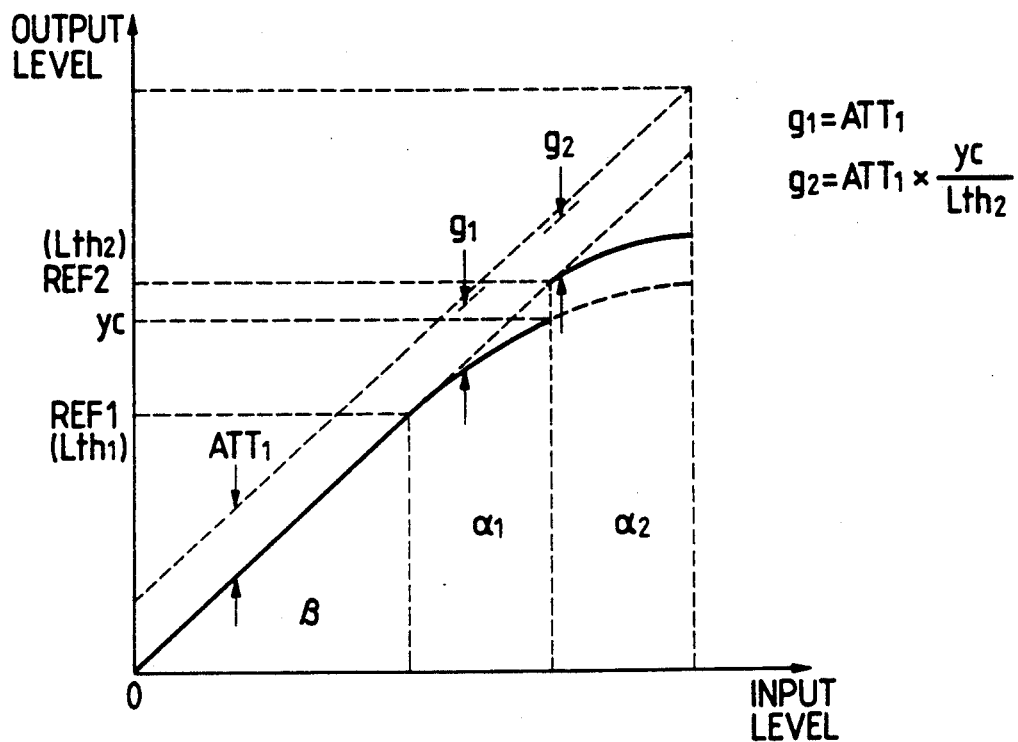
FIGS. 8A and 8B show input/output characteristic of the FIG. 7 circuit arrangement.

In the comparator 77, when the absolute level Lin is lower than the reference level L11, the comparator 77 energizes the coefficient circuit 48 whereby the second multiplier 47 performs a multiplication on the basis of a coefficient ko of the coefficient circuit 48 to cause the adding and subtracting circuit 34 to directly output a signal obtained by attenuating the input signal Xin by a predetermined level by the attenuator 32. Thus, the output characteristic of the adding and subtracting circuit 34 results in being in a region $\beta$ (linear region) in FIG. 8A. On the other hand, when the absolute level Lin is equal to or greater than the reference level L11 and equal to or lower than the reference level L12 (L11$\leq$Lin$\leq$L12), the comparator 77 energizes the reference level generating circuit 71 and the coefficient circuits 73, 75. Therefore, the subtracter 44 outputs the difference $\Delta$ between the absolute Level Lin and the reference level Lth1 (=L11) and the first multiplier 46 squares the difference $\Delta$ to output $\Delta^2$ which is multiplied by the coefficient k1 in the second multiplier 47 so as to output k1$\Delta^2$ which is in turn supplied through the switch 38 to the adding and subtracting circuit 34. The adding and subtracting circuit 34 calculates the difference between the output of the attenuator 32 and the output k1$\Delta^2$ of the second multiplier 47. The output characteristic corresponds to a region $\alpha$1 (first compressing or limiting region) in FIG. 8A. That is, the input signal is compressed or limited slightly in the region $\alpha$1.

Furthermore, when the absolute level Lin is greater than the reference level L12, the reference level generating circuit 72 and the coefficient circuits 74 and 76 are respectively energized whereby the subtracter 44 outputs the difference $\Delta$ between the absolute level Lin and the reference level Lth2 (=L12) and, after squared by the first multiplier 46, the second multiplier 47 multiplies the output of the first multiplier 46 by the coefficient k2 so as to output k2$\Delta^2$ toward the adding and subtracting circuit 34. In this case, since the coefficient k2 is set to be greater than the coefficient k1, as indicated by a region $\alpha$2 (second compressing or limiting region) in FIG. 8A, the adding and subtracting circuit 34 causes the input signal to be more intensely compressed or limited as compared with the region $\alpha$1.

The output of the adding and subtracting circuit 34 is fed to the amplifier 35 so as to be multiplied by a predetermined gain coefficient. In the regions $\beta$ and $\alpha$1, the gain coefficient is set to be g1, and in the region $\alpha$2, the gain coefficient is set to be g2. The gain coefficient g1 corresponds to the attenuation ratio (ATT1) of the attenuator 32 and the gain coefficient g2 is set to the value obtained in accordance with the following equation.

$$g2 = ATT1 \cdot (yc/Lth2)$$

where yc represents the output level of the adding and subtracting circuit 34 in the region $\alpha$1 in the case that the absolute level Lin is equal to the reference level L12.

Figure 8B:
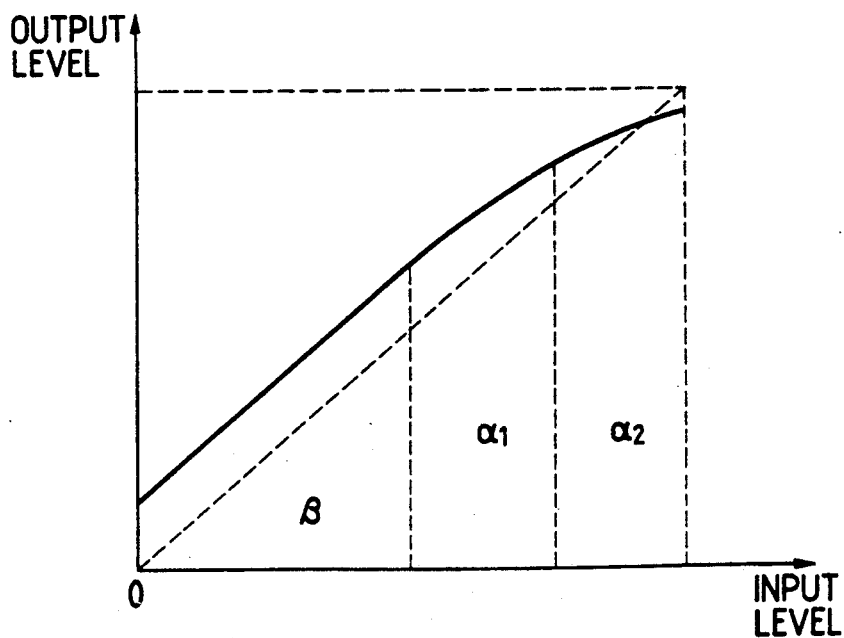

With the above setting of the gain coefficients g1 and g2, the output characteristic of the amplifier 35 can be continuously set to a desirable value, as shown by a solid line in FIG. 8B.

Figure 9:
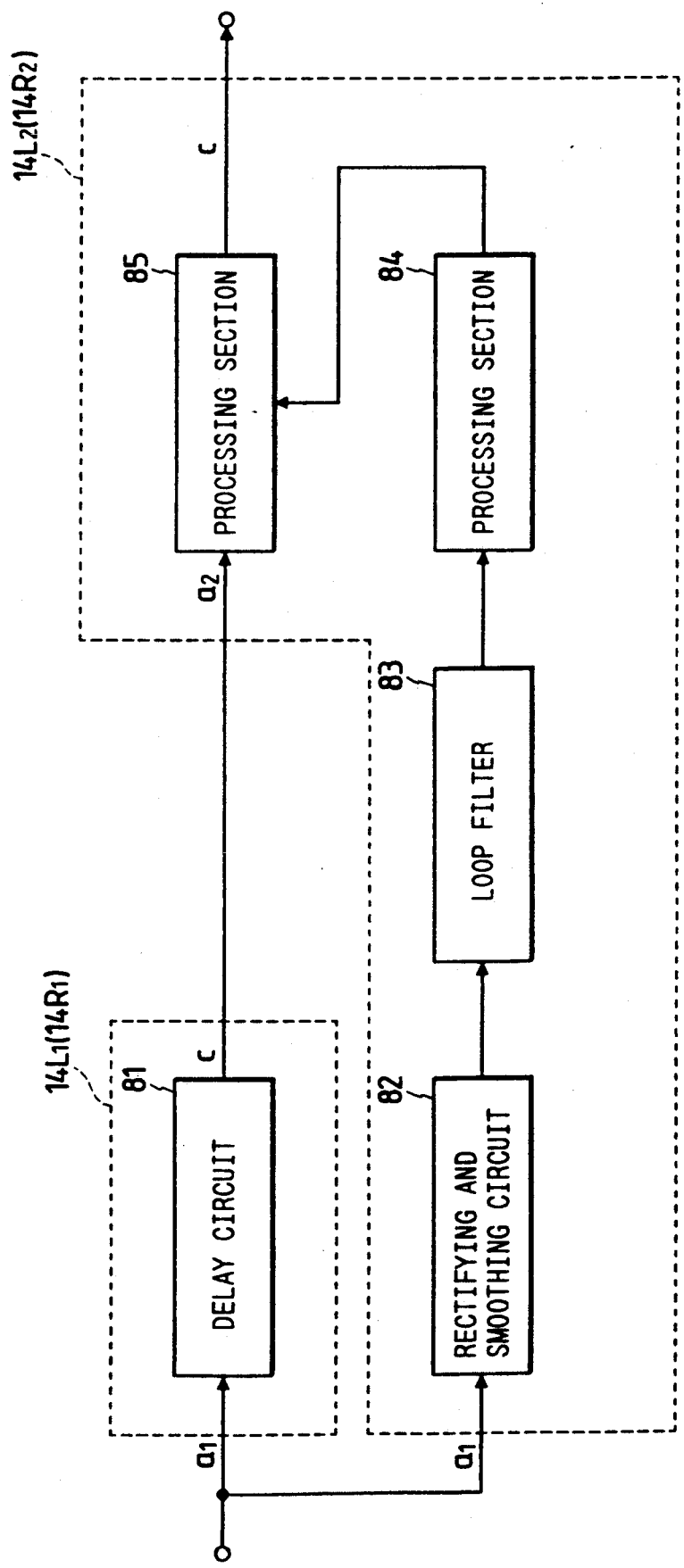
FIG. 9 is a block diagram for describing a fifth embodiment of the present invention.
Figure 10:
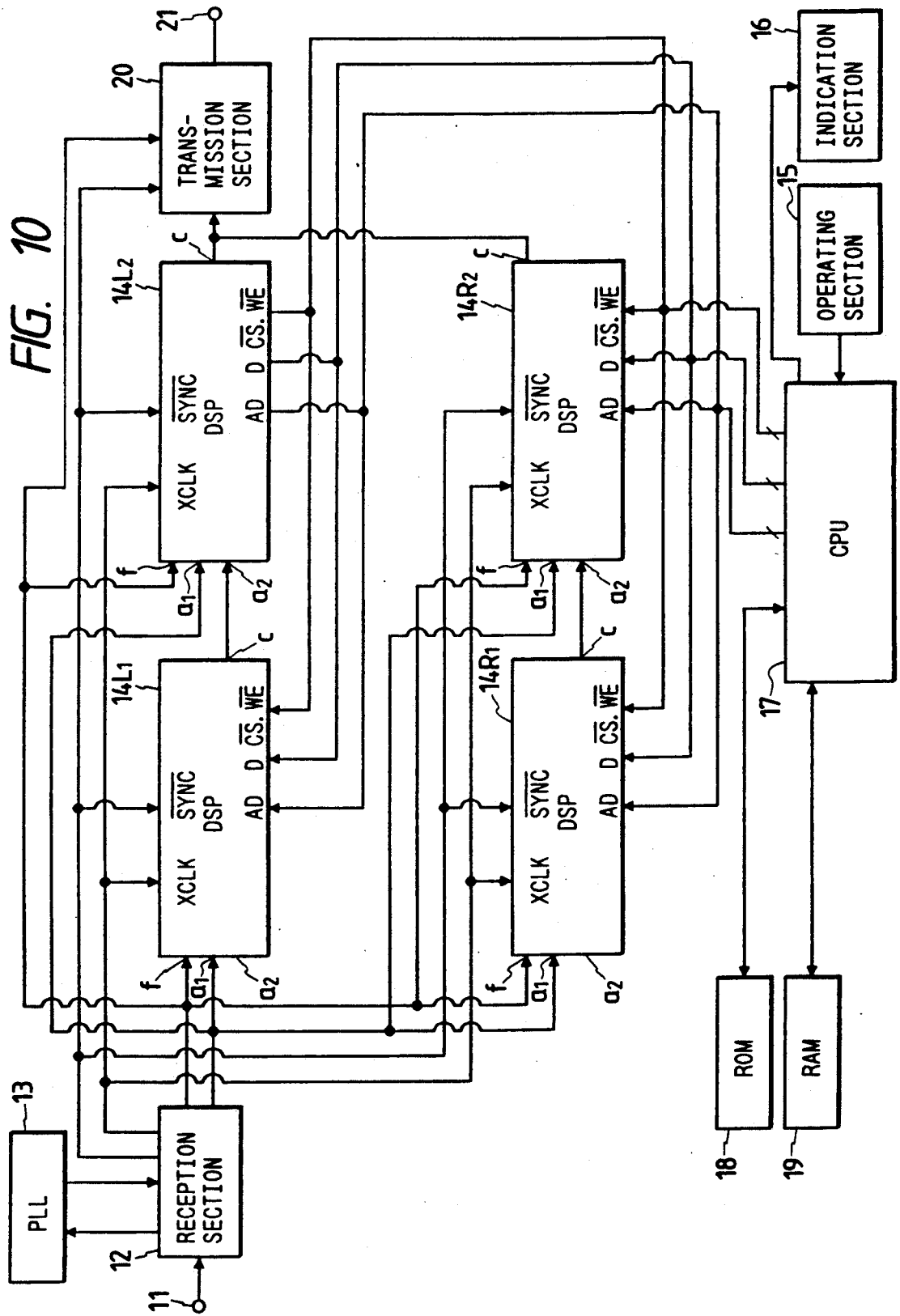
FIG. 10 shows another arrangement of a digitally processing apparatus for an audio signal according to the present invention.

FIG. 9 is a block diagram showing a fifth embodiment of this invention. Here, as illustrated in FIG. 10, to the input terminals al of the processors 14L2 and 14R2 is directly inputted the output data of the reception section 12 and further to the input terminals a2 thereof are respectively inputted the output data from the output terminals c of the processors 14L1 and 14R1. In FIG. 9, this embodiment comprises a delay circuit 81, a rectifying and smoothing circuit 82, a loop filter 83 and processing sections 84, 85. The processor 14L1 or 14R1 acts as the delay circuit 81 and the processor 14L2 or 14R2 is arranged to function as a processing circuit comprising the rectifying and smoothing circuit 82, loop filter 83 and processing sections 84, 85.

Figure 11:
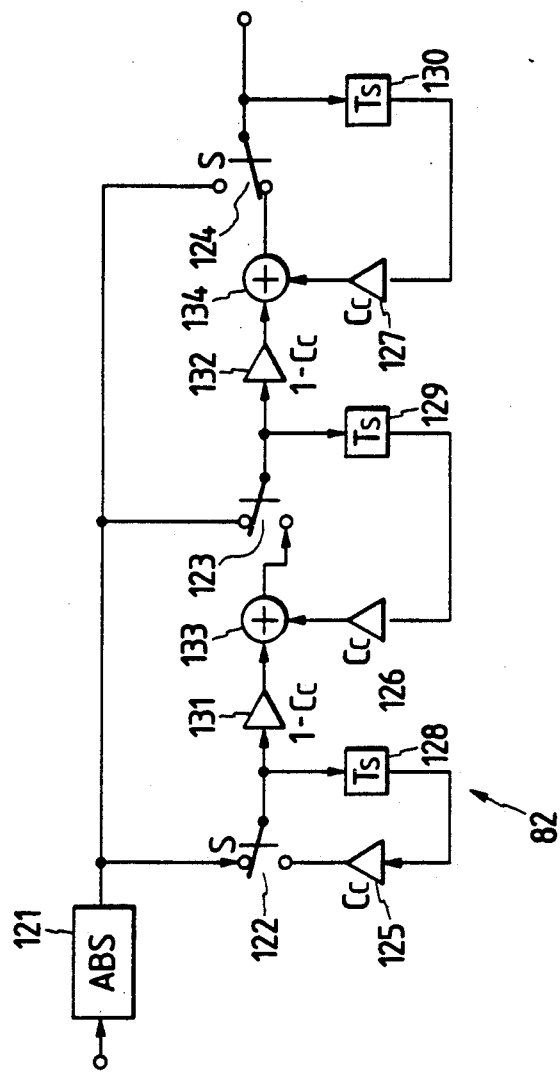
FIG. 11 illustrates a circuit arrangement of a rectifying and smoothing circuit shown in FIG. 9.

The rectifying and smoothing circuit 82, as illustrated in FIG. 11, includes an absolute circuit (ABS) 121, selection switches 122 to 124 for selecting the greater one of two input signals, multipliers 125 to 127 for multiplying its input signal by a predetermined coefficient Cc (0<Cc<1), delay circuits (Ts) 128 to 130 for delaying data by one sampling period, multipliers 131 and 132 for multiplying its input signal by a predetermined coefficient (1−Cc) and adders 133, 134. The absolute circuit 121 detects the absolute value of the input signal Xin and outputs a signal representing the absolute level. The output signal of the absolute circuit 121 is supplied to one input terminal of the selection switch 122. To the other input terminal of the selection switch 122 is inputted a signal which is obtained by delaying the data, selected by the selection switch 122, by one sampling period in the delay circuit 128 and multiplying the delayed data by the coefficient Cc in the multiplier 125. The selection switch 122 detects the grater one of the input signal from the absolute circuit 121 and the input signal from the multiplier 125 and selectively outputs the greater input signal. The selection output of the selection switch 122 is again supplied through the delay circuit 128 and the multiplier 125 to the other input terminal of the selection switch 122 and further supplied to a multiplier 131 to be multiplied by the coefficient (1−Cc), the output signal of the multiplier 131 being fed to the adder 133. The adder 133 is also coupled to the output signal of the selection switch 123 through the delay circuit 129 and the multiplier 126. Thus, the adder 133 adds the output signal of the multiplier 131 to the output signal of the multiplier 126, the output signal of the adder 133 being supplied to one input terminal of the selection switch 123. To the other input terminal thereof is inputted the output signal of the absolute circuit 121.

The selection switch 123 selects the greater one of both input signals and outputs the selection result. The output signal of the selection switch 123 is again supplied through the delay circuit 129 and the multiplier 126 to the adder 133 and further inputted through the multiplier 132 to the adder 134. Moreover, the output of the selection switch 124 is inputted through the delay circuit 130 and the multiplier 127 to the adder 134. The adder 134 performs the addition of both the input signals and outputs the addition result to one input terminal of the selection switch 124. To the other input terminal of the selection switch 124 is supplied the output of the absolute circuit 121. The selection switch 124 selects the greater one of the outputs of the adder 134 and absolute circuit 121 and outputs the selection result. As described above, in this embodiment, the rectifying and smoothing circuit 82 is composed of first to third circuits each comprising the selection switch 122, 123 or 124, the delay circuit 128, 129 or 130 and the multiplier 125, 126 or 127. This is for the purpose of sufficiently ensuring a release time which will be described hereinafter with reference to FIG. 16.

Figure 12:
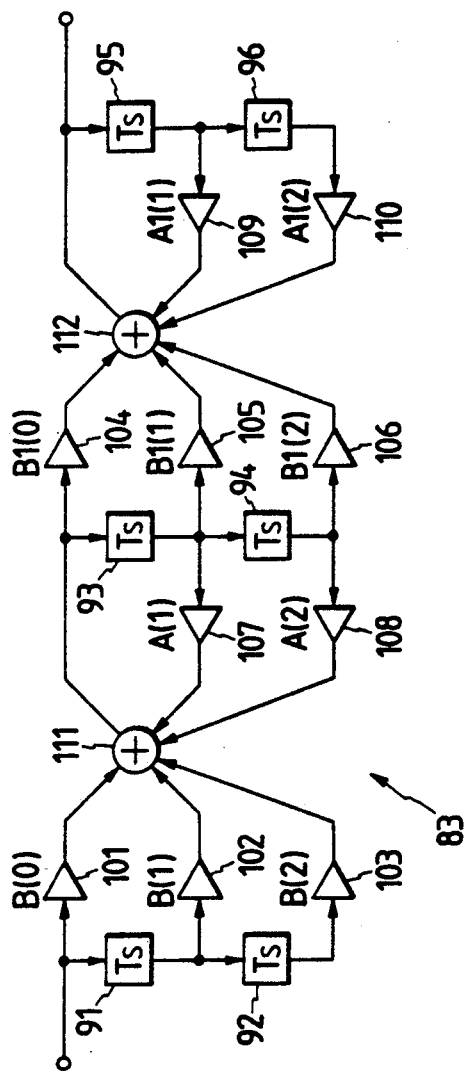
FIG. 12 shows a circuit arrangement of a loop filter illustrated in FIG. 9.

The loop filter 83, as illustrated in FIG. 12, comprises an IIR (infinite impulse response) filter including delay circuits (Ts) 91 to 96 each for delaying data by one sampling period, multipliers 101 to 106 each multiplying its input data by a predetermined coefficient B(0), B(1), B(2), Bl(0), Bl(1) or Bl(2), multipliers 107 to 109 each multiplying its input data by a predetermined coefficient A(1), A(2), Al(1) or Al(2), and adders 111 and 112 for performing addition with respect to its input data.

In the IIR filter, the input data is supplied through the multiplier 101 to the adder 111, further supplied through the delay circuit 91 and multiplier 102 thereto and still further supplied through the delay circuits 91, 92 and multiplier 103 thereto. In addition, the output of the adder 111 is feedbacked through the delay circuit 93 and multiplier 107 to the adder 111 and further feedbacked through the delay circuits 93, 94 and multiplier 108 thereto. The adder 111 performs addition of these inputs and outputs the addition result. The output data of the adder 111 is supplied through the delay circuits 93, 94 and the multipliers 107, 108 thereto as described above, and supplied through the multiplier 104 to the adder 112, further supplied through the delay circuit 93 and multiplier 105 thereto and still further supplied through the delay circuits 93, 94 and multiplier 106 thereto. Moreover, the output data of the adder 112 is feedbacked through the delay circuit 95 and multiplier 109 and further feedbacked through the delay circuits 95, 96 and multiplier 110. The adder 112 performs addition of these inputs and outputs the addition result.

Figure 13:
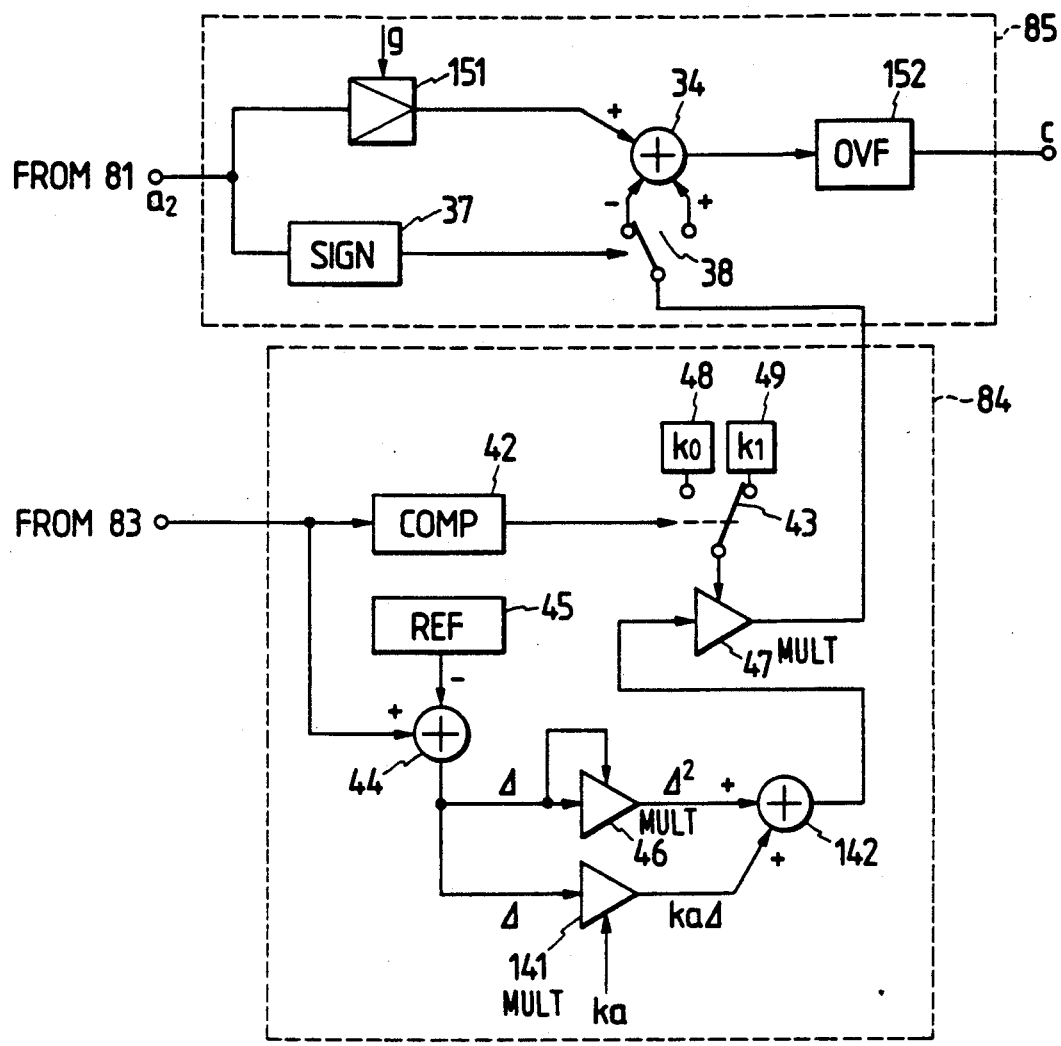
FIG. 13 illustrates circuit arrangements of processing sections shown in FIG. 9.

FIG. 13 illustrates circuit arrangements of the processing sections 84 and 85 where parts corresponding to those in FIG. 3 are marked with the same numerals and characters, and the description thereof will be omitted for brevity. In the processing section 84, the output signal of the loop filter 83 is inputted to a comparator 42 coupled to a switch 43 for performing switching operation between coefficient circuits 48 and 49 and further to a subtracter 44. The subtracter 44 obtains the difference $\Delta$ between the output of the loop filter 83 and the output (a reference level) of a reference level generating circuit 45 and outputs a signal representing the difference $\Delta$ to a multiplier 46 for squaring the difference $\Delta$ and further to a multiplier 141 for multiplying the difference $\Delta$ by a predetermined coefficient ka (for example, ka=$\frac{1}{2}$, $\frac{1}{3}$, $\frac{1}{4}$ ... ). The outputs of the multipliers 46 and 141 are respectively supplied to an adder 142 which in turn adds ka$\Delta$ to $\Delta^2$ and outputs ka$\Delta+\Delta^2$ to a multiplier 47. After multiplying the output (ka$\Delta+\Delta^2$) of the adder 142 by a coefficient ko or k1, the multiplier 47 supplies its output signal to the other processing section 85.

Figure 14:
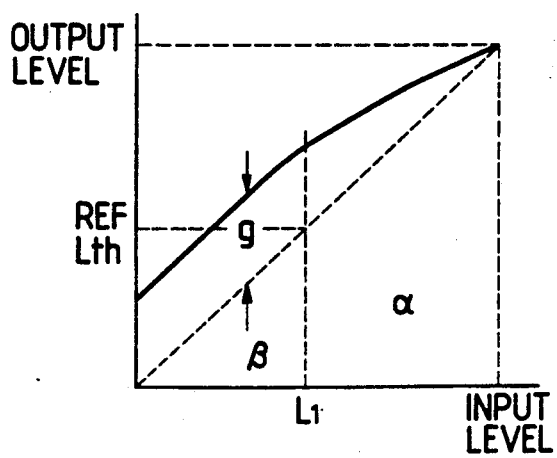
FIG. 14 is a graphic illustration for describing the input/output characteristic of the FIG. 9 circuit arrangement.

In the processing section 85, the output of the delay circuit 81 is multiplied by a predetermined gain coefficient g in an amplifier 151 and then supplied to an adding and subtracting circuit 34. The output of the delay circuit 81 is also fed to a sign decision circuit (SIGN) 37 which detects the sign of the output thereof so as to effect the switching operation of a switch 38 which is in turn coupled to the output side of the multiplier 47 of the first-mentioned processing section 84. The adding and subtracting circuit 34 calculates the difference between the output of the amplifier 151 and the output of the multiplier 47 and outputs the calculated difference to an overflow detection circuit (OVF) 152. The overflow detection circuit 152 outputs its input signal as it is when the level of the input signal is below a predetermined value and outputs a predetermined signal when the level thereof becomes above the predetermined value (when overflowing), whereby the output characteristic can be obtained as illustrated in FIG. 14.

Here, in the case that the input signal is a music signal, the level thereof is varied continuously, and therefore the compressing or limiting characteristic varies in accordance with the variation of the input level. This causes difference of the sound quality from that of the original. Thus, it is preferable that the characteristic is not varied for a predetermined time period. Furthermore, persons are generally sensitive to a variation in which a sound signal rapidly becomes great, whereas they are not so sensitive to a variation in which a sound rapidly becomes weak. Accordingly, if the characteristic is always kept to be constant for a predetermined time period, the sound signal which rapidly becomes great becomes unnatural in hearing. Therefore, it is preferable that the characteristic is kept for a relatively short time period with respect to the rapidly increasing variation and, on the other hand, kept for a relatively long time period with respect to the rapidly decreasing variation.

Figure 15A:
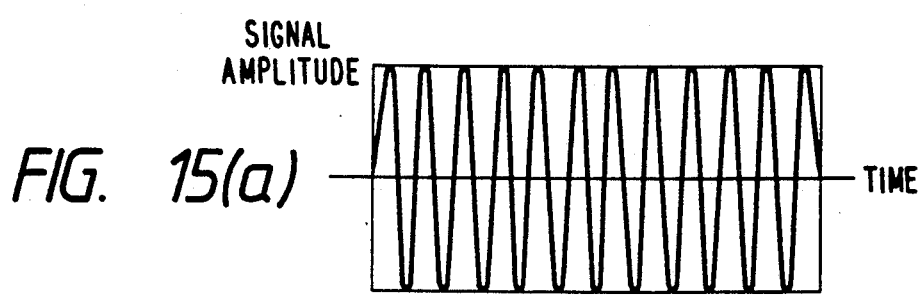
FIGS. 15(a), 15(b), 15(c) and 16(a), 16(b) are waveform diagrams illustrating the operations of a loop filter and a rectifying and smoothing circuit shown in FIG. 9.
Figure 15B:
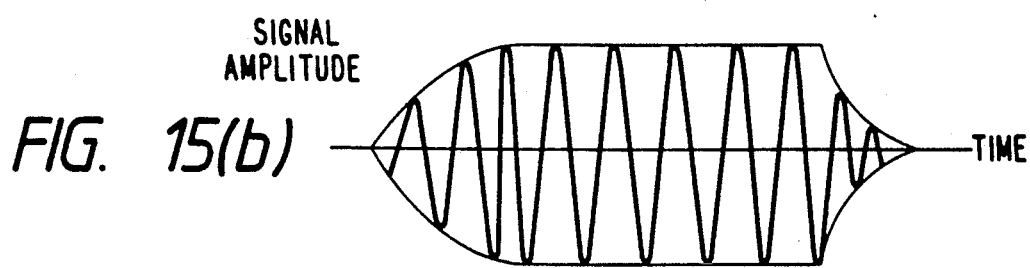
Figure 15C:
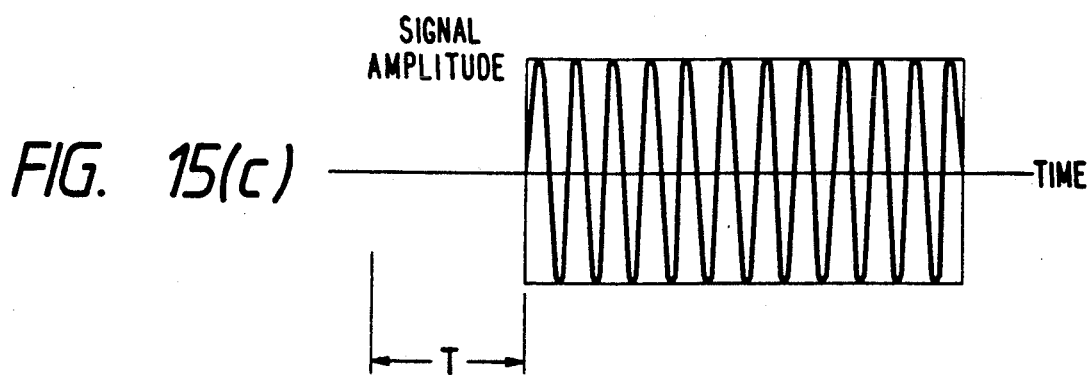

The loop filter 83 is a filter provided in the feed forward loop system in order to set an attack time to be a relatively short time in correspondance with the variation in which the input level rapidly increases. The attack time is a time period taken until the signal becomes in the normal state on rapidly increasing. As a result, in response to input of a signal (illustrated as being an analog signal for convenience), as indicated in FIG. 15(a), from the rectifying and smoothing circuit 82, the output of the loop filter 83 results in becoming a signal as indicated by FIG. 15(b). If the signal processing is performed in the processing section 85 in accordance with the parameters such as the coefficients k0 and k1 determined in the processing section 84 in correspondance with the partially de-emphasized signal, the signal processing is in error. Thus, as indicated by FIG. 15(c), the input signal is delayed by a predetermined time period T in the delay circuit 81. This delay time period T is set to be sufficient for eliminating the de-emphasized portion of the signal indicated by FIG. 15(b). As a result, in the processing section 85, the de-emphasized portion can be eliminated at the processing timing of the input signal, thereby preventing the undesirable signal processing.

Figure 16A:
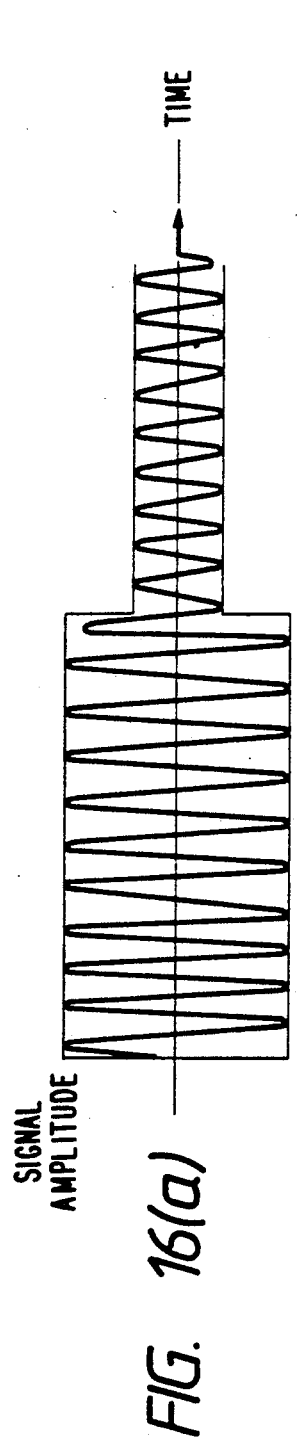
Figure 16B:
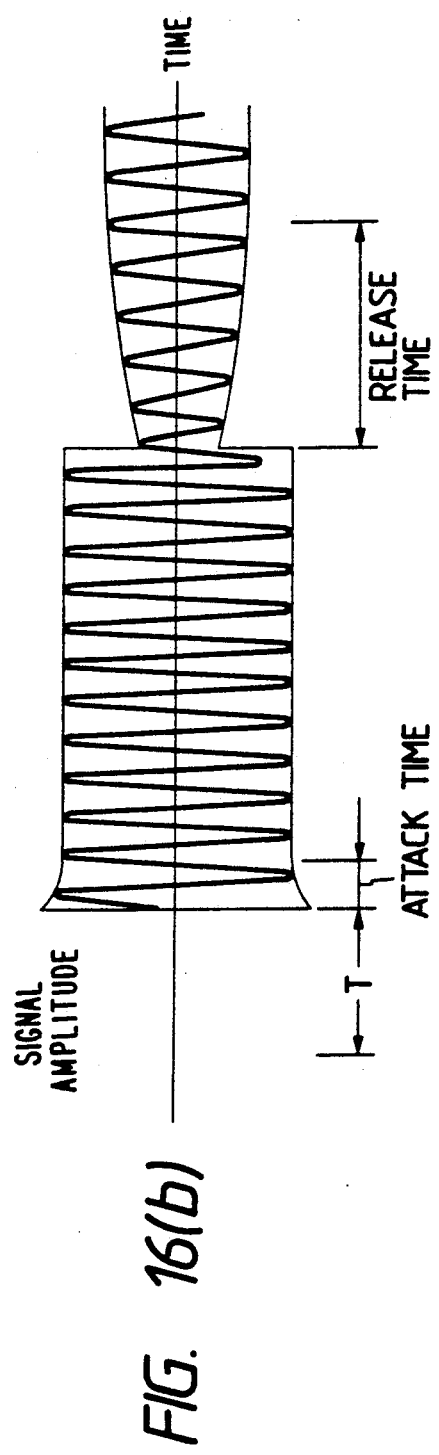

On the other hand, the rectifying and smoothing circuit 82 has a function to rectify its input signal to energize the loop filter 83 and further has a function to set a relatively long release time period in correspondance with the rapidly increasing variation of the level. That is, this circuit has a characteristic to integrate the signal. The release time is a time period taken until the signal returns to the normal state on rapidly decreasing. Accordingly, in the case of an input signal as indicated by FIG. 16(a), the delay circuit 81 delays the input signal by the predetermined time period T as indicated by FIG. 16(b). Moreover, the input signal is processed so as to have an attack time period determined by the loop filter 83 and a release time period determined by the rectifying and smoothing circuit 82. Although the release time period can be set by the loop filter 83, the time period is short in correspondance with the attack time period and hence it is required to provide the rectifying and smoothing circuit 82. Similarly, although the attack time period can be set by the rectifying and smoothing circuit 82, the time period is considerably longer as compared with the attack time period and hence the attack time period due to the loop filter 83 is used preferentially.

Figure 17:
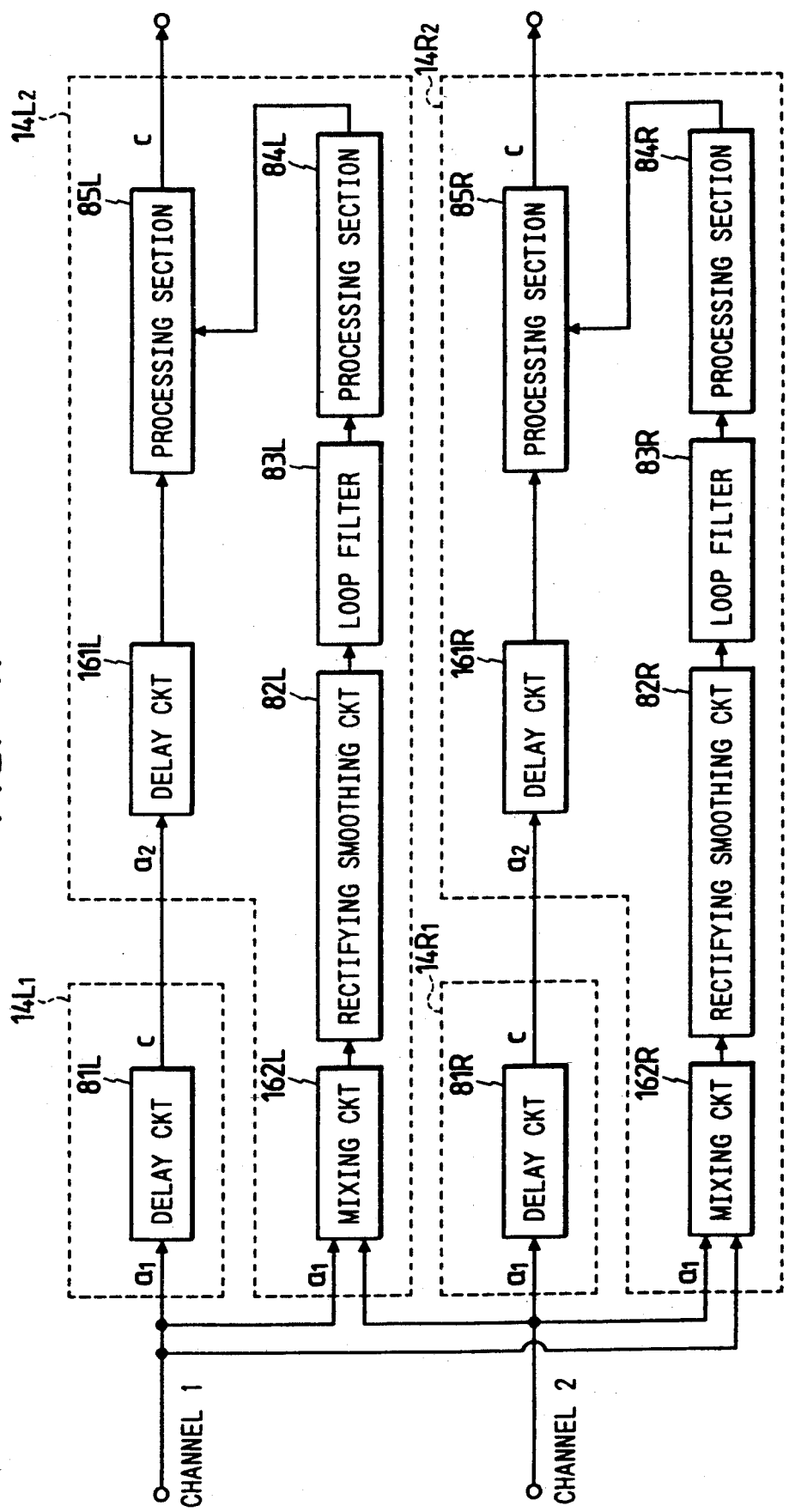
FIG. 17 is a block diagram showing a sixth embodiment of this invention.

FIG. 17 shows a sixth embodiment of this invention which is a modification of the aforementioned fifth embodiment, where parts corresponding to those in FIG. 9 are marked with the references made with the same numerals and characters L and R representing left and right channels. The description thereof will be omitted for brevity. In this embodiment, in the digital signal processors 14L2 and 14R2, mixing circuits 162L and 162R are respectively provided so that the left and right channel (channel 1 and 2) input signals are supplied through the mixing circuits 162L and 162R to rectifying and smoothing circuits 82L and 82R. Each of the mixing circuits 162L and 162R mixes the right and left input signals to output the average of both the signals to the rectifying and smoothing circuit 82L or 82R. The provision of the mixing circuits 162L and 162R is suitable for the case that the difference between the levels of the left and right channel signals is small.

Also included are delay circuits 161L and 161R which are provided between the delay circuits 81L, 81R and the processing sections 85L, 85R. These delay circuits 161L and 161R determine the delay time in cooperation with the delay circuits 81L and 81R.

Figure 18:
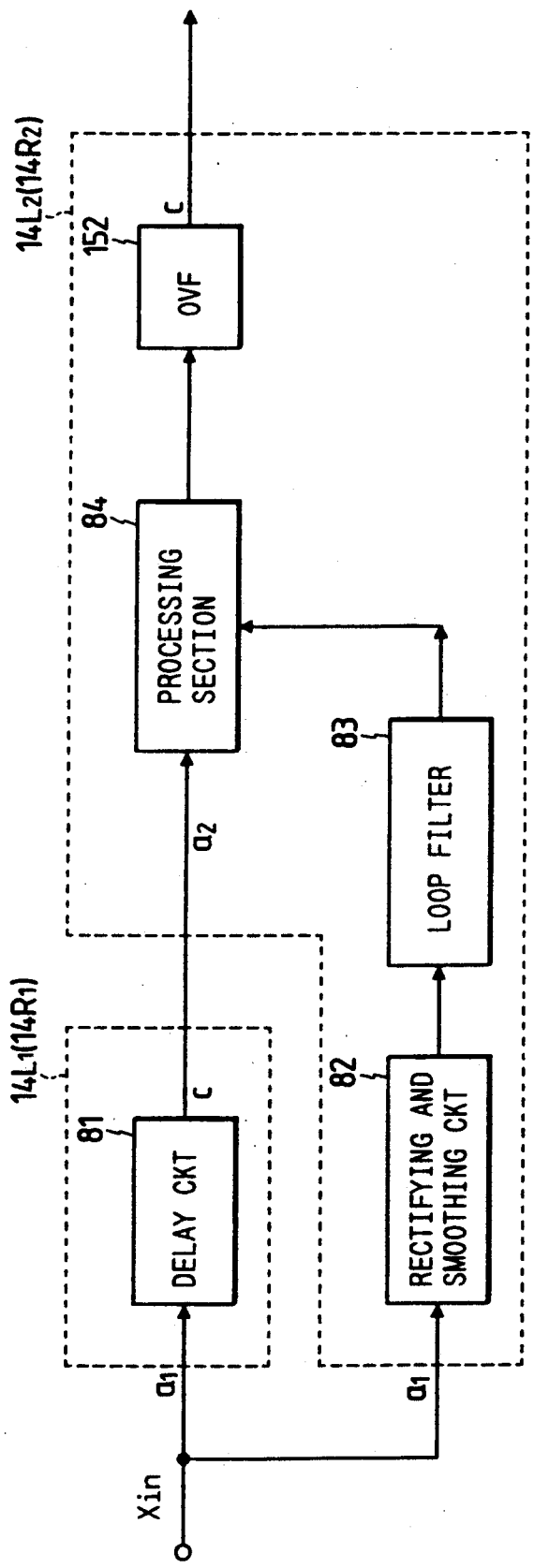
FIG. 18 is a block diagram for describing a seventh embodiment of this invention.

FIG. 18 is a block diagram for describing a seventh embodiment which performs a delay processing and a limiting or compressing process to be performed in the processors 14L1 (or 14R1) and 14L2 (or 14R2) in FIG. 10 audio signal processing apparatus where parts corresponding to those in FIGS. 9 and 13 are marked with the same references and the description will be omitted for brevity. The processor 14L1 (or 14R1) acts as a delay circuit 81 and the processor 14L2 (or 14R2) functions as a processing circuit comprising a rectifying and smoothing circuit 82, a loop filter 83, a processing section 84 and an overflow detection circuit (OVF) 152.

The rectifying and smoothing circuit 82 has an arrangement as described above with reference to FIG. 11 and the loop filter 83 has an arrangement as described above with reference to FIG. 12.

Figure 19:
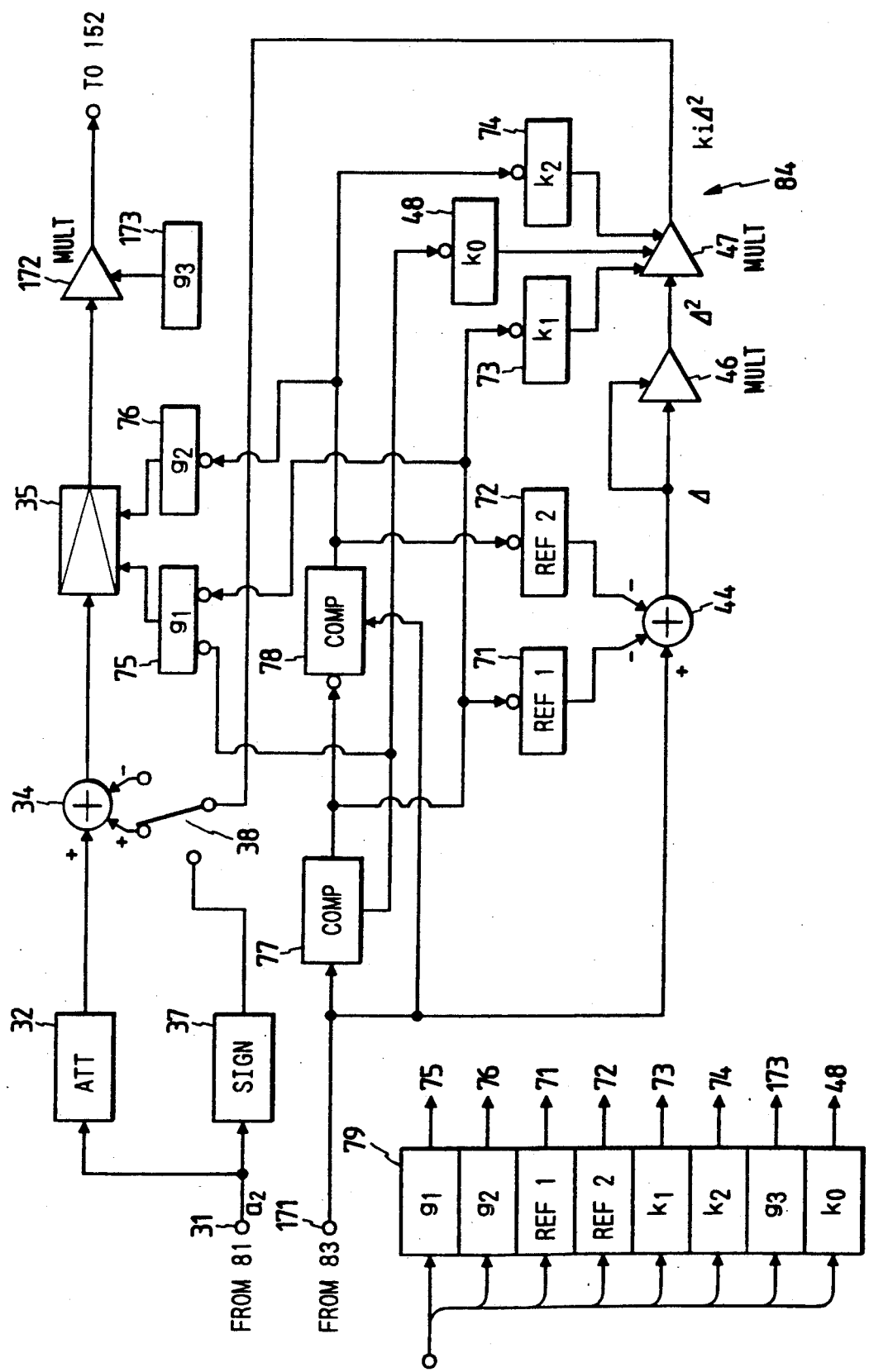
FIG. 19 shows a circuit arrangement of a processing section illustrated in FIG. 18.

The processing section 84 will be described hereinbelow with reference to FIG. 19 in which parts corresponding to those in FIG. 7 are marked with the same numerals and characters. In FIG. 19, the output of the delay circuit 81 is supplied through an input terminal 31 to the processing section 84 and the output of the loop filter 83 is fed through another input terminal 171 thereto. The input signal (digital data signal) inputted to the input terminal 31 is led to an attenuator (ATT) 32 and further to a polarity decision circuit (SIGN) 37. The attenuator 32 attenuates the input signal by a predetermined level and then outputs the attenuated input signal to an adding and subtracting circuit 34, and the polarity decision circuit 37 checks the sign (positive or negative) of the input signal to operate a switch 38 in accordance with the checked sign so that the switch 38 is switched to the right side in the Figure when the sign is positive and to the left side when it is negative.

Figure 20A:
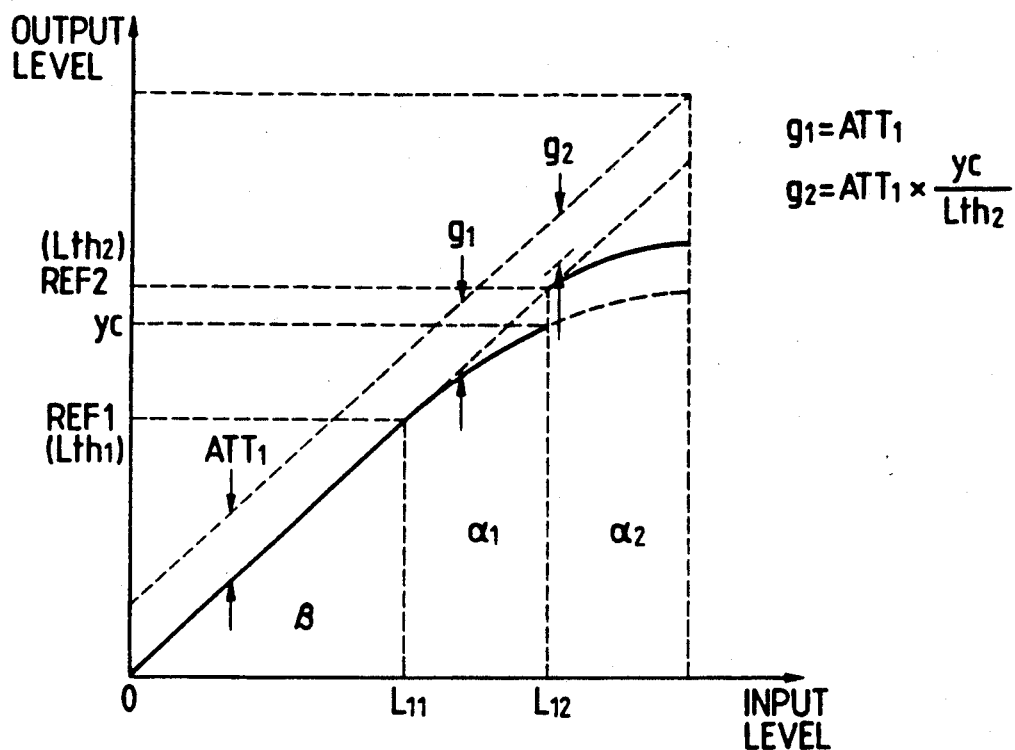
FIGS. 20A and 20B are graphic illustrations for describing the input/output characteristic of the FIG. 20 circuit arrangement.

On the other hand, the input signal from the loop filter 83 is supplied to a comparator (COMP) 77 and then to a comparator (COMP) 78. Here, the input signal from the loop filter 83 represents the level Lin of the original input signal (Xin) because of being rectified and smoothed in the rectifying and smoothing circuit 82. In the comparators 77 and 78, the level Lin is compared with reference levels L11 and L12 (L11 < L12). When the level Lin is higher than the reference level L11, the comparator 77 energizes a coefficient circuit 48 whereby in a multiplier 47 the coefficient is set to be ko (=0). As a result, the adding and subtracting circuit 34 outputs, as it is, the input signal attenuated by the predetermined level in the attenuator 32. In this case, the output characteristic of the adding and subtracting circuit 34 becomes in a region $\beta$ (linear region) in FIG. 20A.

When the level Lin is equal to or higher than the reference level L11 and equal to or lower than the reference level L12 (L11 $\leq$ Lin $\leq$ L12), the comparator 77 energizes a reference level generating circuit (REF1) 71 and coefficient circuits 73, 75., whereby a subtracter 44 outputs the difference $\Delta$ between the level Lin and a reference level Lth1 (=L11) determined by the reference level generating circuit 71. A multiplier 46 squares the difference $\Delta$ therebetween and the multiplier 47 multiplies the squared difference $\Delta^2$ by a coefficient k1 determined by the coefficient circuit 73. As a result, the adding and subtracting circuit 34 calculates the difference between the output k1$\Delta^2$ and the output of the attenuator 32. In this case, the output characteristic is in a region $\alpha$1 (first compressing or limiting region) in FIG. 20A. That is, the input signal is compressed or limited slightly.

Furthermore, when the level Lin is higher than the reference level L12, the comparator 77 energizes a reference level generating circuit 72 and coefficient circuits 74, 76, whereby the subtracter 44 outputs the difference $\Delta$ between the level Lin and a reference level Lth2 (=L12) determined by the reference level generating circuit 72 and the multiplier 46 squares the difference $\Delta$ therebetween and the multiplier 47 multiplies the output $\Delta^2$ of the multiplier 46 by a coefficient k2 determined by the coefficient circuit 74. Since the coefficient k2 is set to be greater than the coefficient k1, the output characteristic of the adding and subtracting circuit 34 is in a region $\alpha$2 (second compressing or limiting region) in FIG. 20A. That is, the adding and subtracting circuit 34 enhances the degree of the compressing or limiting for the input signal as compared with the above-mentioned region α1.

The output of the adding and subtracting circuit 34 is multiplied by a gain coefficient g1 or g2 in an amplifier 35. In the regions β and α1, the gain coefficient is set to be g1, and in the region 8 it is set to be g2. The coefficient g1 corresponds to the attenuation ratio (ATT1) of the attenuator 32, and the coefficient g2 is determined in accordance with the following equation.

$$g2 = ATT1 \cdot (yc/Lth2)$$

where yc represents the output level of the adding and subtracting circuit 34 in the region α1 under the condition that the level Lin is equal to the reference level L12.

Such a determination of the gain coefficients g1 and g2 can continuously set the output characteristic of the amplifier 35 to a desirable value.

Figure 20B:
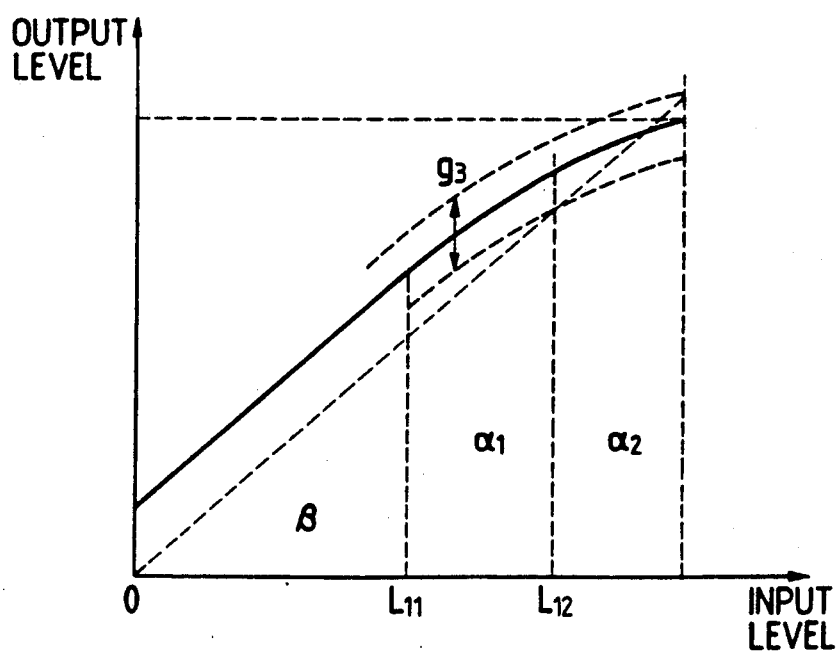

The output of the amplifier 35 is supplied to a multiplier 172 which is coupled to a coefficient circuit 173, whereby the output of the amplifier 35 is multiplied by a gain coefficient k3 of the coefficient circuit 173. This is for adjusting the level of the output signal thereof irrespective of the input signal level Lin. The output of the multiplier 172 is supplied to the overflow detection circuit 152. The overflow detection circuit 152 outputs the input signal as it is when the input signal level is below a predetermined value and outputs a predetermined signal when it is above the predetermined value, thereby obtaining the output characteristic as illustrated in FIG. 20B.

The reference levels Lth1, Lth2, coefficients ko to k2 and gain coefficients g1 to g3 are respectively determined in accordance with operation of the operating section 15 in FIG. 10 and set through a parameter memory 79 to the reference level generating circuits 71, 72, and coefficient circuits 48, 73 to 76 and 173.

Figure 21:
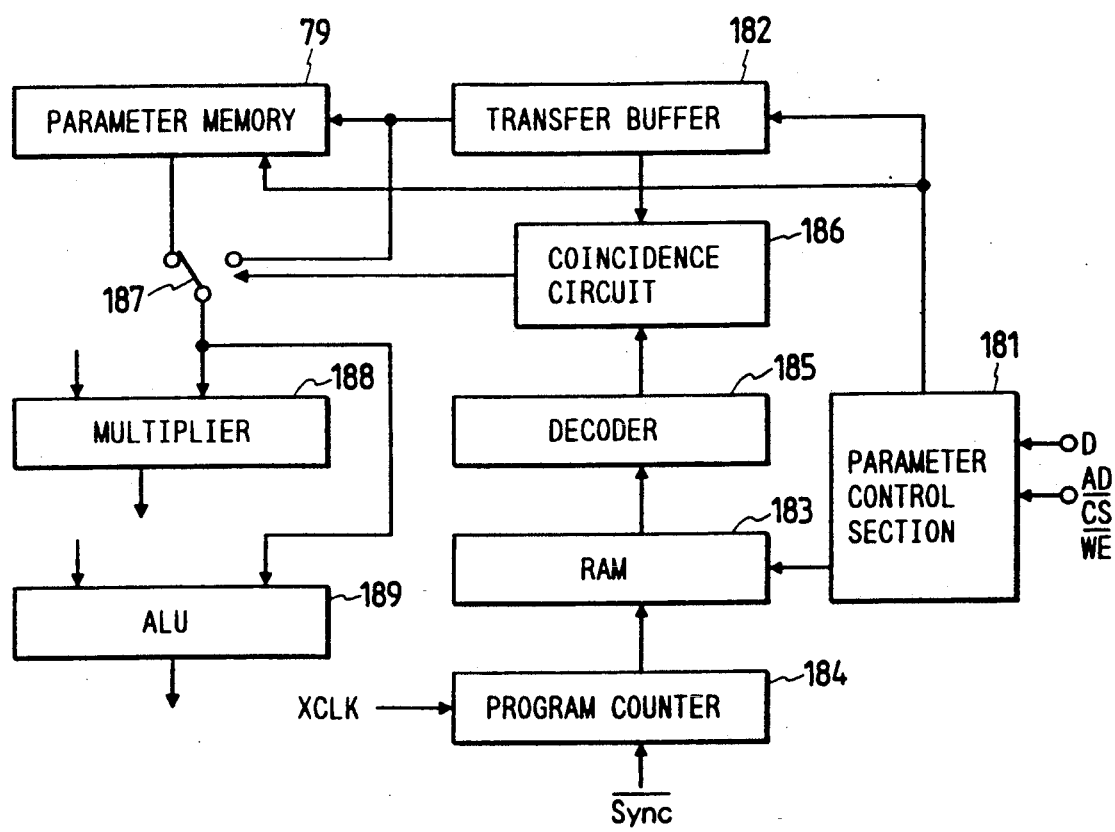
FIG. 21 is a block diagram for describing the function of digital signal processors in FIG. 10 in terms of setting and changing parameters.
Figure 22:
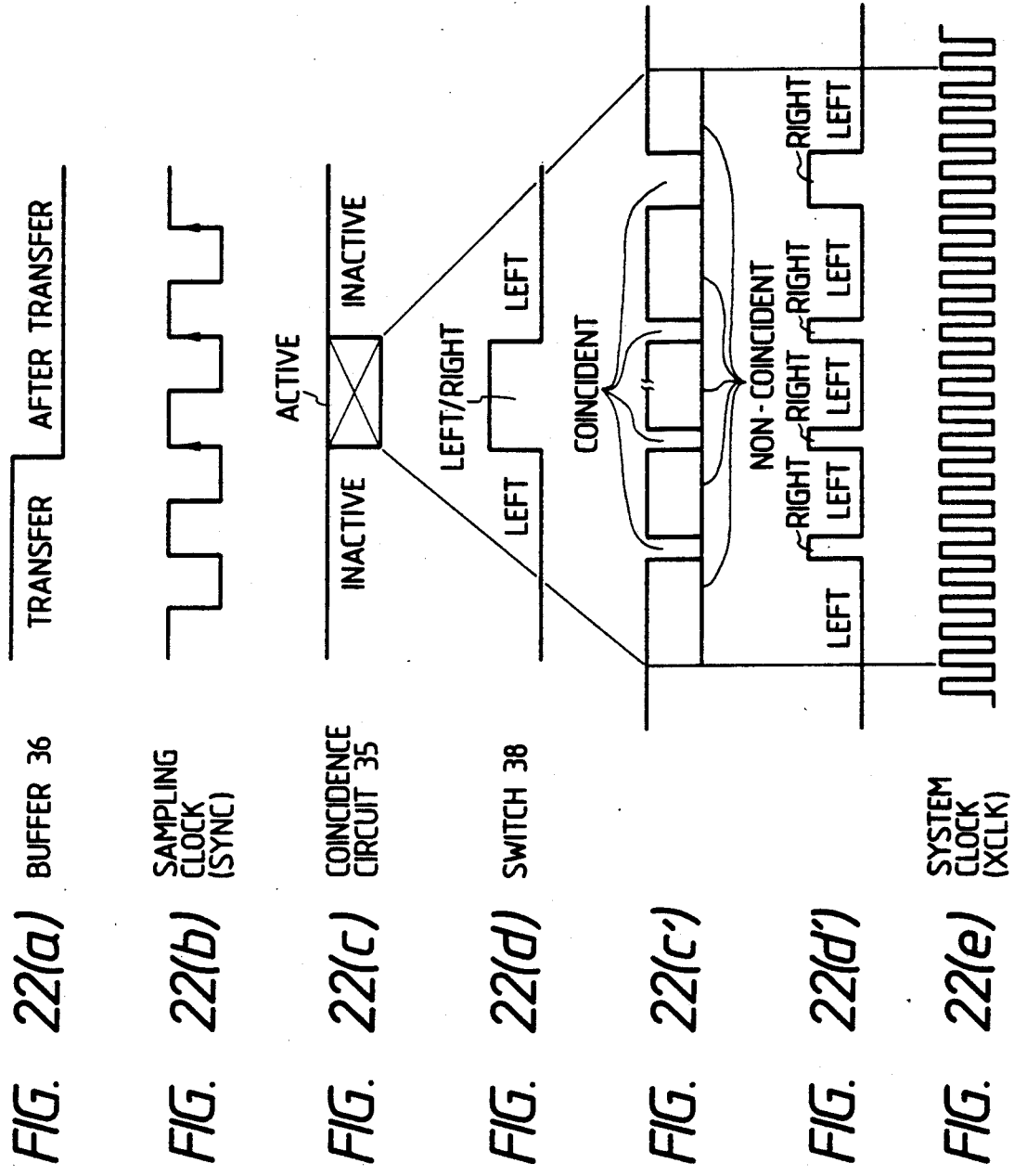

FIG. 21 is a block diagram for describing the functions of the processors 14L2 and 14R2 in terms of setting and changing the parameters such as the abovementioned reference levels and coefficients. In FIG. 21, illustrated at numeral 181 is a parameter control section which is responsive to a switching signal AD, a chip select signal CS, a writing enable signal WE and data D from the CPU 17. The switching signal AD is for designating a destination of the data D, the chip select signal CS is for selecting one of the processors 14L1 and 14R2 and the writing enable signal WE is for controlling the writing of the data to a transfer buffer 182. When a RAM (static RAM) 183 is designated by the switching signal AD, the parameter control section 181 supplies the RAM 183 with the program data transferred from the CPU 17 so as to be stored therein. A program counter 184 counts the inputted system clock XCLK, the count value being arranged to be reset in response to an input of the synchronizing signal SYNC.

The program data are read out from the ROM 183 on the basis of the address corresponding to the count value inputted from the program counter 184, and supplied to a decoder 185. The decoder 185 decodes the inputted program data (command) and outputs control signals, not shown, for circuits in the processors 14L2 and 14R2. The control signal is also supplied to a coincidence circuit 186.

At the time of the initial setting, the parameter memory (static RAM) 79 is designated by the switching signal AD. At this time, the parameter control section 181 supplies the parameter memory 79 with the parameter data fed from the CPU 17, the parameter data being stored in the parameter memory 79. Here, a switch 187 is normally arranged to take the left side position in FIG. 21 and hence the parameter data readout from the parameter memory 79 are outputted to a multiplier 188 and further to an ALU (arithmetic and logical unit) 189. The multiplier 188 multiplies the parameter by an input signal from a circuit, not shown, and the ALU 189 performs subtraction or the like with respect thereto.

Further, in the case of updating, the transfer buffer 182 is designated by the switching signal AD. At this time, the parameter control section 181 supplies the transfer buffer 182 with the parameter data inputted from the CPU 17. The transfer buffer 182 temporarily stores the inputted parameter data. The transfer of the parameter data from the CPU 17 to the transfer buffer 182 is performed at a desirable speed. The multiplier 188 and ALU 189 correspond to the multiplier 47 and subtracter 44, respectively.

FIG. 22(a) to 22(e) form a timing chart for describing the parameter setting and changing operation. After completion of the transfer to the transfer buffer 182 (see FIG. 22(a)), during one sampling period starting from the next rising edge of the sampling clock SYNC (FIG. 22(b)), the coincidence circuit 186 is made active (FIG. 22(c)) and compares the program address (included in the data) from the decoder 185 with the program address (included in the data) from the transfer buffer 182. When both the program addresses are coincident with each other (FIG. 22(c')), the coincidence circuit 186 switches the switch 187 to the right side in FIG. 21 (FIG. 22(d) and 22d'FIG. 22) during the next one system clock period (FIG. 22(e)). At this time, the parameter data is transferred from the transfer buffer 182 to the addresses of the parameter memory 79 designated by the program address, and at the same time the parameter data are further supplied through the switch 187 to the multiplier 188 and the ALU 189. Therefore, the multiplier 188 performs the multiplication with a different parameter and the ALU performs the subtraction with a different parameter. Here, if the parameter data from the transfer buffer 182 is temporarily stored in the parameter memory 79 and then outputted to the multiplier 188, the program for the parameter updating is required to be different from the program to be used at the time of the initial setting.

After completion of the parameter updating, operation returns to the operation performed after the initial setting.

Figure 23:
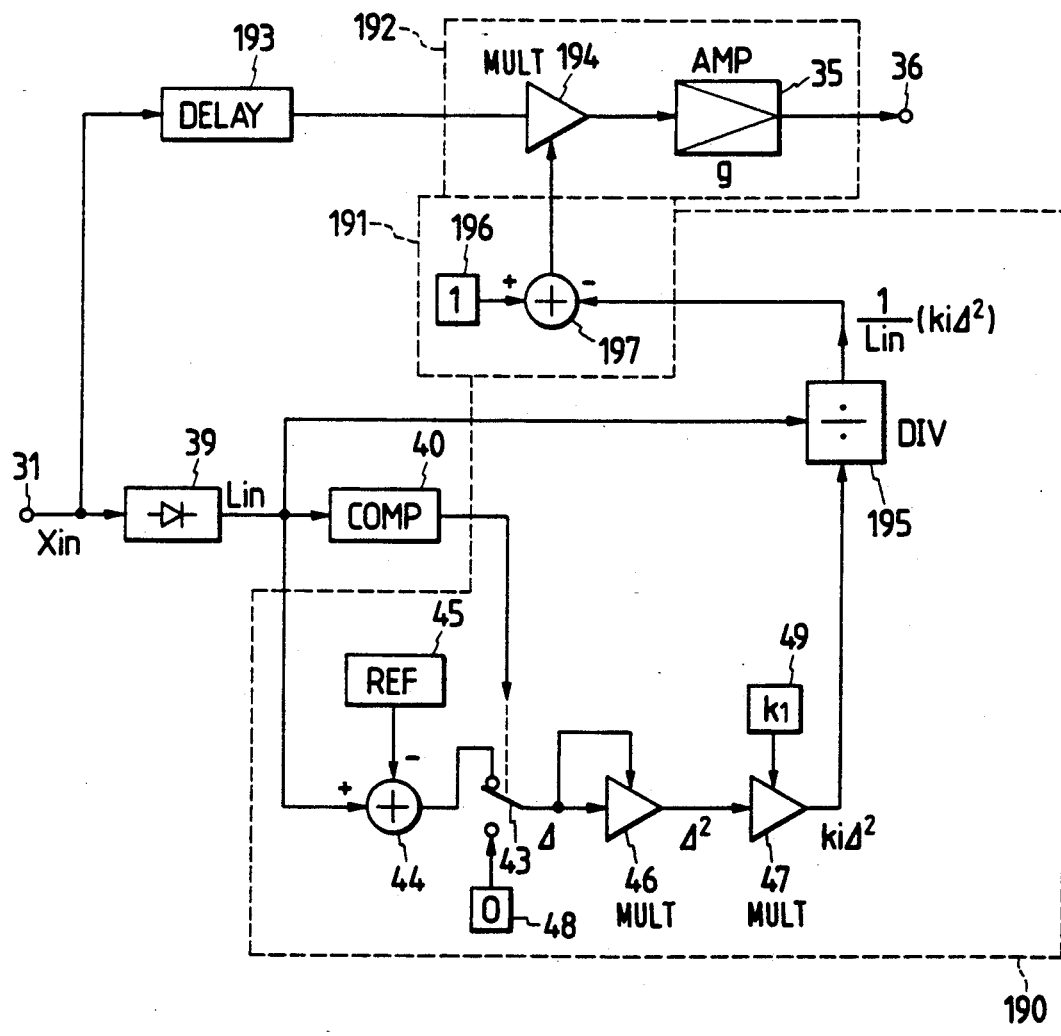
FIG. 23 is a block diagram showing an eighth embodiment of the present invention.

A signal level processing apparatus according to an eighth embodiment of the present invention will be described hereinbelow with reference to FIG. 23 showing an circuit arrangement corresponding to the processors 14L2 and 14R2 in FIG. 1. Parts corresponding to those in FIG. 3 are marked with the same numerals and characters. In FIG. 23, the signal level processing apparatus of this embodiment includes an absolute circuit 39, a comparator 40, a calculation section 190, a difference calculation section 191, a multiplication section 192 and a delay circuit (DELAY) 193.

The absolute circuit 39 detects the absolute value Lin of an input signal (digital data) Xin fed through an input terminal 31 thereinto and outputs the detection result to the comparator 40. The comparator 40 compares the absolute level Lin with a predetermined threshold level (reference level) Lth (=L1). The output of the comparator 40 is fed to the calculation section 190. In the calculation section 190, a switch 43 is responsive to the output of the comparator 40 so as to causes a multiplier 46 to be coupled to a coefficient circuit 48 or a subtracter 44 in accordance with the output thereof. When the absolute level Lin is lower than the reference level Lth, the comparator 40 switches the position of a movable contact of the switch 43 to the lower side in FIG. 23 so that the coefficient circuit 48 whose coefficient 0 is coupled to the multiplier 46 whereby the output of the calculation section 190 becomes zero and is supplied to the difference calculation section 191. In this case, the input signal Xin supplied through the delay circuit 193 to the multiplication section 192 is multiplied by a coefficient 1 in a multiplier 194 and then amplified with a gain g in an amplifier 35, thereafter being outputted through an output terminal 36. As a result, the input and output characteristic is in a region $\beta$ (linear region) in FIG. 24 so as not to perform the limiting or compressing process with respect to the input signal Xin.

On the other hand, in the comparator 40, when the absolute level Lin is greater than the reference level Lth, the comparator 40 switches the movable contact of the switch 43 to the upper side so that the multiplier 46 is coupled to output side of the subtracter 44 which is responsive to the output of the absolute circuit 39. In this case, the output of the subtracter 44 which is the difference $\Delta$ between the absolute level Lin and a reference level of a reference level generating circuit 45 is supplied to the multiplier 46 which squares the difference $\Delta$, the output $\Delta^2$ of the multiplier 46 being supplied to the multiplier 47 which multiplies the output $\Delta^2$ by a coefficient k1 from a coefficient circuit 49 to produce an output k1$\Delta^2$. That is, the subtracter 44 and the multiplier 47 calculate functions relating to the difference between the absolute level Lin and the reference level Lth.

Also included in the calculation section 190 is a divider (DIV) 195 which is coupled to the output (Lin) of the absolute circuit 39 and the output k1$\Delta^2$ of the multiplier 47 so as to divide the output k1$\Delta^2$ by the absolute level Lin to output (1/Lin) (k1$\Delta^2$). The output of the divider 195 is supplied to the difference calculation section 191 which comprises a coefficient circuit 196, whose coefficient is 1, and a subtracter 197. The subtracter 197 is coupled to the output of the divider 195 so as to take the difference between the coefficient 1 and the output (1/Lin)·(k1$\Delta^2$) which difference is in turn supplied to the multiplier 194 of the multiplication section 192. The multiplier 194 multiplies the output (1−(1/Lin)·(k1$\Delta^2$)) by the input signal Xin supplied through the delay circuit 193 to be delayed by predetermined sampling period.

At this time, if assuming that the delay time is zero, when Xin$\geq$0, since Lin=Xin, the multiplication results in being as expressed by the following equation.

$$Xin \cdot (1-(1/Lin) \cdot (k1\Delta^2)) = Xin - k1\Delta^2 \quad (1)$$

Further, when Xin<0, since Lin=−Xin, the following multiplication result can be obtained.

$$Xin \cdot (1-(1/Lin) \cdot (k1\Delta^2)) = Xin + K1\Delta^2 \quad (2)$$

Figure 24:
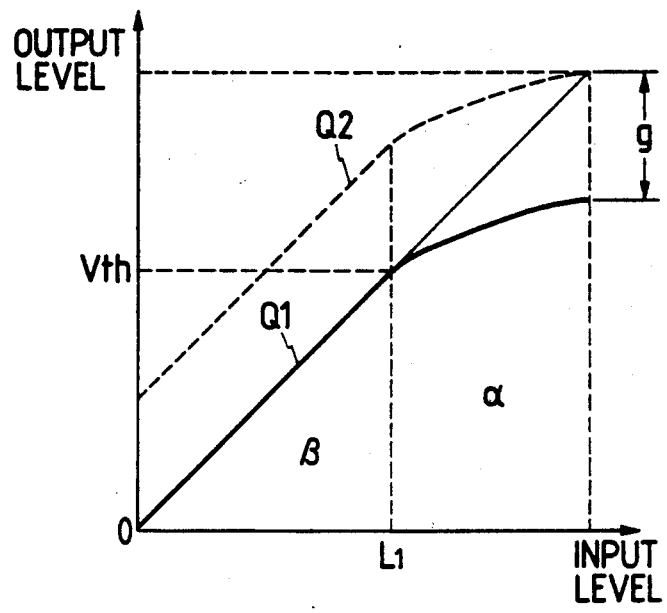
FIG. 24 is a graphic illustration for describing input/output characteristic.

In the case that the delay time is not zero, the multiplication result differs from the aforementioned equations (1) and (2). Here, the gain for the delay signal (input signal of the multiplier 194) is changed in accordance with the absolute level Lin of the input signal Xin so as to perform the compressing or limiting process of the input signal Xin even if the input signal whose level rapidly varies is introduced through the delay circuit 193, thereby obtaining the input and output characteristic Q1 (solid line) as illustrated in FIG. 24 and further obtaining the input and output characteristic Q2 (dotted line) as illustrated in the same figure by amplifying the output of the multiplier 194 with the gain g.

Figure 25:
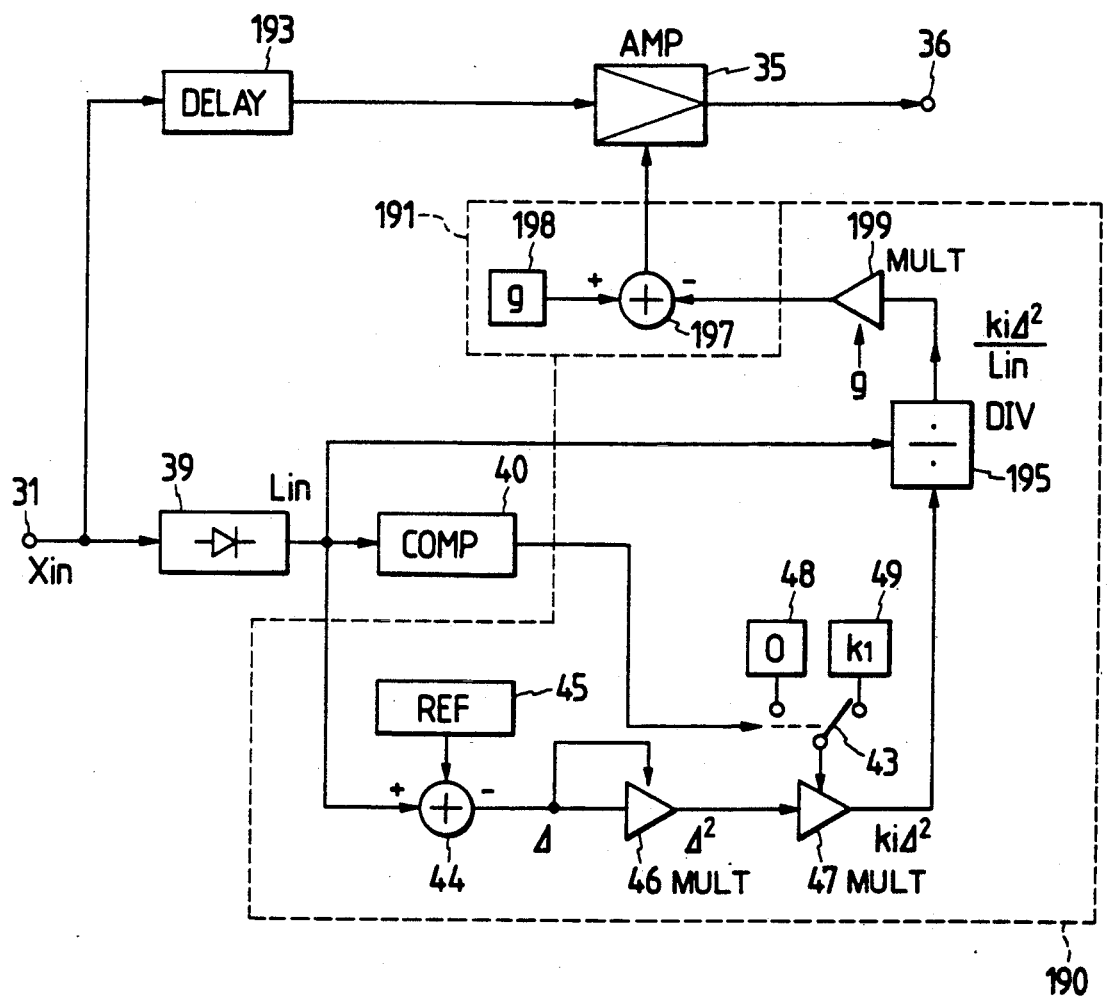
FIG. 25 is a block diagram showing a ninth embodiment of the invention.

FIG. 25 is a ninth embodiment of this invention in which parts corresponding to those in FIG. 23 are marked with the same numerals and characters and the description thereof will be omitted for brevity. In FIG. 25, an input signal Xin fed through an input terminal 31 is supplied through a delay circuit 193 to an amplifier 35 and further supplied through an absolute circuit 39 to a comparator 40. The output of the absolute circuit 39 is further supplied into a calculation section 190 comprising a subtracter 44, multipliers 46, 47, a divider 195 and a multiplier 199. The comparator 40 compares the absolute level Lin of the input signal Xin with a predetermined level Lth (=L1) and controls a switch 43 of the calculation section 190 in accordance with the comparison result. When the absolute level Lin is lower than the reference level Lth, the comparator 40 switches the movable contact of the switch 43 to the left side in the Figure so that the multiplier 47 is coupled to a coefficient circuit 48 whose coefficient is zero whereby the output of the calculation section 190 becomes zero and supplied through a difference calculation section 191, comprising a subtracter 197 and a coefficient circuit 198, to the amplifier 35. The amplifier 35 amplifies the output signal (delayed input signal Xin) of the delay circuit 193 with the gain g of the coefficient circuit 198 and outputs the amplification result toward an output terminal 36. In this case, the input and output characteristic corresponds to the region $\beta$ (linear region) in FIG. 24, in which the limiting or compressing process is not effected.

On the other hand, when the absolute level Lin is higher than the reference level Lth, the comparator 40 operates the movable contact of the switch 43 to be switched to the right side in the Figure so that the multiplier 47 is coupled to a coefficient circuit 49 whose coefficient is k1. As a result, the output $\Delta^2$ of the multiplier 46 which is obtained by taking the difference $\Delta$ between the absolute level Lin and a reference level L1 in the subtracter 44 and squaring the difference $\Delta$ in the multiplier 46 is multiplied by the coefficient k1. The output k1$\Delta^2$ of the multiplier 47 is divided by the absolute level Lin in the divider 195, the output k1$\Delta^2$/Lin of which is supplied to the multiplier 199. The multiplier 199 multiplies the output k1$\Delta^2$/Lin by a coefficient g so as to obtain g·(k1$\Delta^2$/Lin). The subtracter 197 is responsive to the output of the multiplier 199 so as to perform the subtraction between the multiplier 199 output and the coefficient g of the coefficient circuit 198. The subtraction result g−g(k1$\Delta^2$/Lin) is used as a gain in the amplifier 35 whereby the delayed input signal Xin is amplified with the subtraction result. In this case, the input and output characteristic corresponds to a region $\alpha$ (non-linear region) in FIG. 24.

Figure 26:
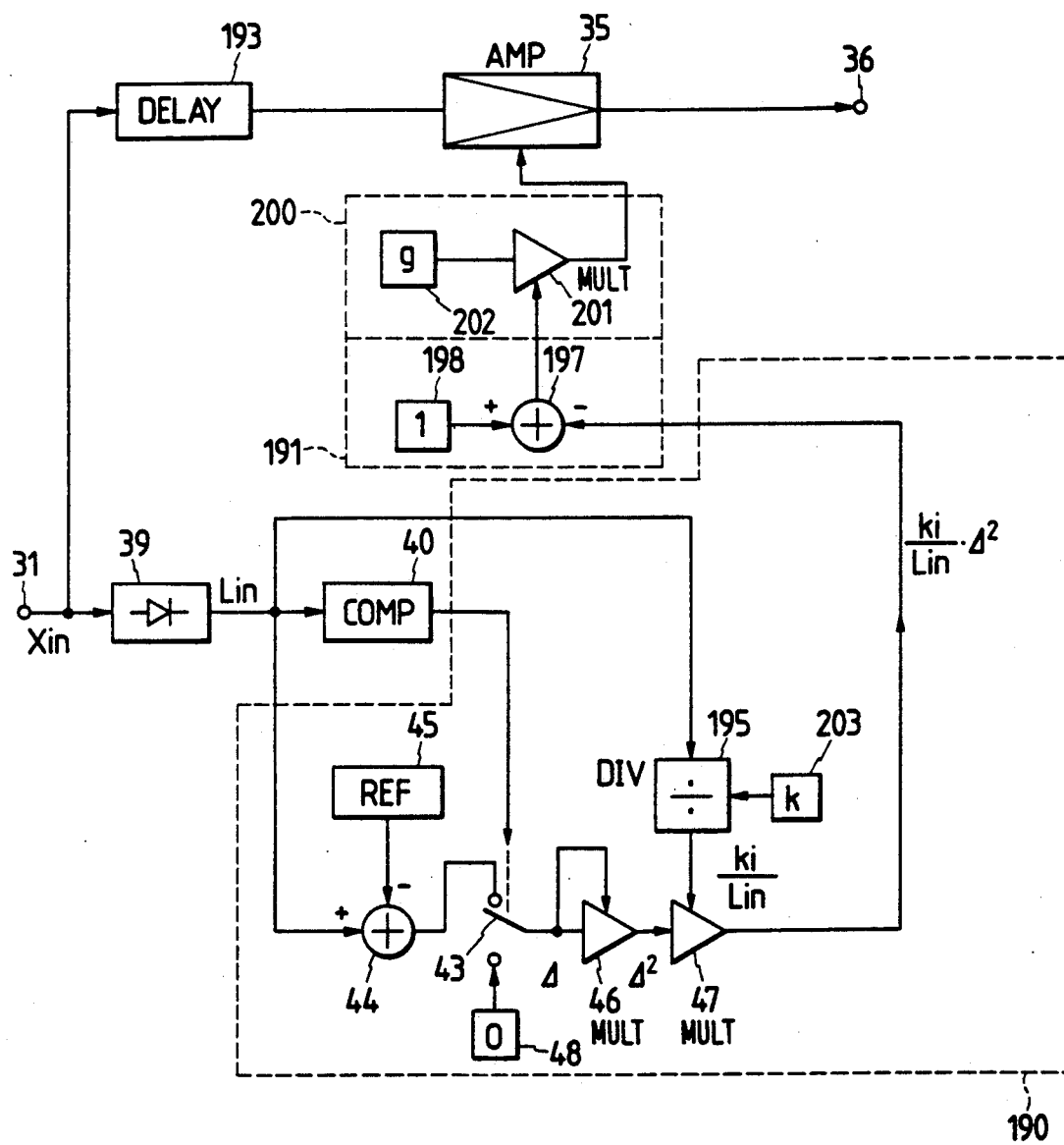
FIG. 26 is a block diagram showing a tenth embodiment of the invention.

FIG. 26 shows a tenth embodiment of this invention in which parts corresponding to those in FIGS. 23 and 25 are marked with the same numerals and characters. In FIG. 26, an input signal Xin inputted from an input terminal 31 is introduced to an delay circuit 193 and then to an amplifier 35, and the input signal Xin is also introduced into an absolute circuit 39 the output of which is supplied to a comparator 40 and further to a subtracter 44 and a divider 195 of a calculation section 190. As similar to the above-described embodiments, the comparator 40 compares the absolute level Lin with a reference level Lth (=L1) so as to operate a switch 43 in accordance with the comparison results When the absolute level Lin is lower than the reference level Lth, the comparator 40 switches the movable contact of the switch 43 to the lower side in FIG. 26 so that a multiplier 46 is coupled to a coefficient circuit 48 whose coefficient is zero whereby the output of the calculation section 190 becomes zero and is supplied to a difference calculation section 191 comprising a subtracter 197 and a coefficient circuit 198 which has a coefficient 1. The output of the difference calculation section 191 becomes 1 and is supplied to a multiplication section 200 comprising a multiplier 201 and a coefficient 202 whose coefficient is g. The output of the multiplication section 200 becomes g and is supplied to the amplifier 35 which in turn amplifies the delayed input signal Xin with g and outputs the amplification result to an output terminal 36. In this case, the input and output characteristic corresponds to a region $\beta$ in FIG. 24.

On the other hand, when the absolute level Lin is greater than the reference level Lth, the comparator 40 switches the movable contact of the switch 43 to the upper side in the Figure so that the subtracter 44 is coupled through the switch 43 to the multiplier 46. As a result, the output of the subtracter 44 which is the difference $\Delta$ between the absolute level Lin and a reference level L1 from a reference level generating circuit 45 is supplied to the multiplier 46 which squares the difference therebetween and further to the multiplier 47. The multiplier 47 is also responsive to the output of a divider 195 which receives the output of the absolute circuit 39 and a coefficient k1 from a coefficient circuit 203 to divide the coefficient k1 by the absolute level Lin. The multiplier 47 multiplies the output k1/Lin of the divider 195 by the output $\Delta^2$ of the multiplier 46 and outputs the multiplication result (k1/Lin)·$\Delta^2$ to the difference calculation section 191. The subtracter 197 of the difference calculation section 191 performs subtraction between the output of the multiplier 47 and a coefficient 1 of the coefficient circuit 198. The output $(1-(k1/Lin)\cdot\Delta^2)$ thereof is supplied to the multiplier 201 of the multiplication section 200 which in turn multiplies the output $(1-(k1/Lin)\cdot\Delta^2)$ by the coefficient g of the coefficient circuit 202 so as to output the multiplication result $g\cdot(1-(k1/Lin)\cdot\Delta^2)$ to the amplifier 35 where the delayed input signal Xin is amplified in accordance with the multiplication result of the multiplication section 200 which is used as an amplification gain In this case, the input/output characteristic corresponds to the region $\alpha$ in FIG. 24. That is, the input signal is compressed or limited.

Although in the above-described embodiments the calculation section (190) calculates the function (for example, k1$\Delta^2$) based on the difference between the absolute level Lin and the reference level L1, the function is not limited to the second order function and it is also appropriate to use a third order or higher order function and to use a first order function in the case that the compression ratio is as great as 100:1. Further, the calculation section is not limited to the above-described arrangements as long as it can finally obtain (k1$\Delta^2$)/Lin=f($\Delta$)/Lin.

Figure 27:
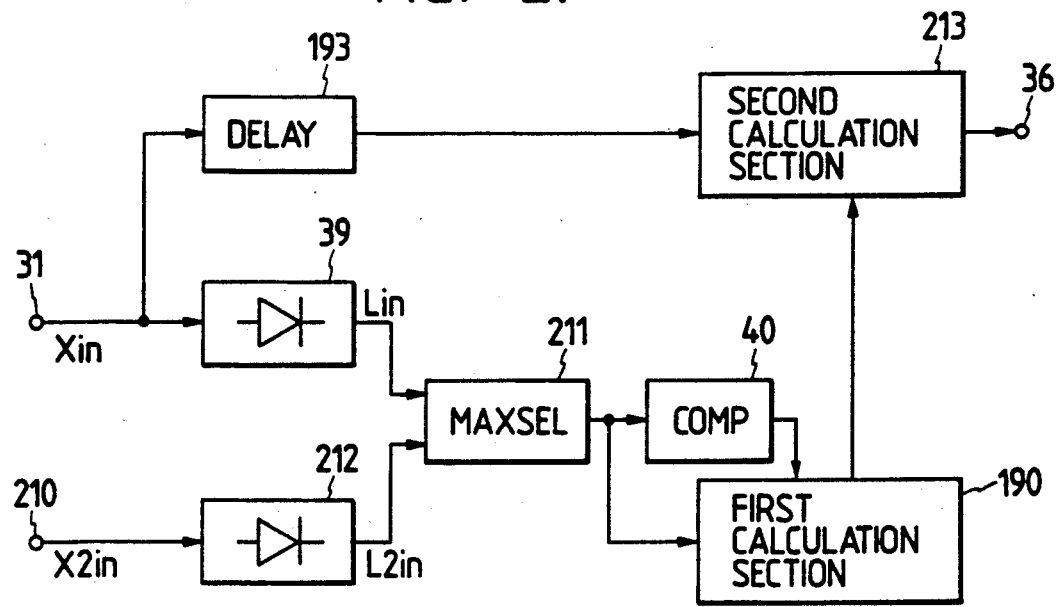
FIG. 27 is a block diagram for describing compressing or limiting processes of two data.

FIG. 27 is a block diagram for describing the compressing or limiting process of the data from the output terminals b and c of the processor 14L1 or 14R1 in which parts corresponding to those in FIGS. 23, 25 and 26 are marked with the same numerals and characters and the detailed description thereof will be omitted. In FIG. 27, an input signal Xin outputted from the output terminal b of the processor 14L1 or 14R1 is inputted to an input terminal 31 (corresponding to the terminal a1 of the processor 14L2 or 14R2) and further to a delay circuit 193, and an input signal X2in outputted from the output terminal c of the processor 14L1 or 14R1 is inputted to another input terminal 210 (corresponding to the input terminal a2 of the processor 14L2 or 14R2). An absolute circuit 39 detects the absolute value of the level of the input signal Xin and outputs a signal representing the absolute level Lin to a maximum-value selection circuit (MAXSEL) 211. On the other hand, another absolute circuit 212 detects the absolute value of the level of the input signal X2in and outputs a signal representing the absolute level L2in to the maximum-value selection circuit 212. The maximum-value selection circuit 212 selects the greater one of both the absolute levels Lin and L2in and outputs the selection result to a first calculation section 190 and further to a comparator 40. The output of the first calculation section 190 is supplied to a second calculation section 213 (corresponding to the difference calculation section 191, the multiplication section 192 and others) which processes the delayed input signal Xin from the delay circuit 193 as described above and outputs the processing result to an output terminal 36 (corresponding to the output terminal c of the processor 14L2 or 14R2). With this arrangement, the outputs of the first calculation sections 190 for the left and right channels become equal to each other, thereby keeping the sound image balance to be constant.

It should be understood that the forgoing relates to only preferred embodiments of the present invention, and that it is intended to cover all changes and modifications of the embodiments of this invention herein used for the purposes of the disclosure, which do not constitute departures from the spirit and scope of the invention.

What is claimed is:

1. A digital signal processing system comprising:
    a central processing unit (CPU); and
    at least one digital signal processor (DSP) controlled by said CPU, wherein said DSP includes:
    comparison means responsive to an input signal of said system for comparing a level of said input signal with a predetermined reference signal;
    calculation means coupled to said comparison means for calculating a function on the basis of a difference between said input signal and said predetermined reference level when said input signal level is higher than said predetermined reference level;
    polarity decision means for determining a polarity of said input signal;
    adding and subtracting means coupled to said calculation means and said polarity decision means for performing a selected one of an adding and a subtraction of said input signal with respect to an output of said calculation means representing the calculated function, in accordance with the polarity determined by said polarity decision means; and
    multiplication means coupled to said adding and subtracting means for multiplying an output of said adding and subtracting means by a predetermined gain coefficient, to produce an output of said system.

2. A system as claimed in claim 1, wherein said DSP further includes:
attenuating means provided between an input terminal of said comparison means and said adding and subtracting means to attenuate the input signal of said comparison means by a predetermined level to output the attenuated input signal to said adding and subtracting means.

3. A digital signal processing system comprising:
a central processing unit (CPU); and
at least one digital signal processor (DSP) controlled by said CPU, wherein said DSP includes:
comparison means responsive to an input signal of said system for comparing a level of said input signal with a first reference level and with a second reference level higher than said first reference level;
calculation means coupled to said comparison means for calculating a first function on the basis of a difference between said input signal level and said first reference level when said input signal level is higher than said first reference level and lower than said second reference level and for calculating a second function on the basis of a difference between said input signal level and said second reference level when said input signal level is higher than said second reference level;
polarity decision means for determining a polarity of said input signal;
adding and subtracting means coupled to said calculation means and said polarity decision means for performing a selected one of an addition and a subtraction of said input signal with respect to an output of said calculation means representing the calculated first or second function in accordance with the polarity determined by said polarity decision means; and multiplication means coupled to said adding and subtracting means for multiplying an output of said adding and subtracting means by a first gain coefficient when said input signal level is higher than said first reference level and lower than said second reference level and for multiplying the output thereof by a second gain coefficient when said input signal level is higher than said second reference level, to produce an output of said system.

4. A digital signal processing system comprising:
a central processing unit (CPU); and
at least one digital signal processor (DSP) controlled by said CPU, wherein said DSP includes:
rectifying means for rectifying an input signal of said system and setting at least a release time period with respect to said input signal;
filter means coupled to said rectifying means for setting at least an attack time period with respect to an output of said rectifying means;
calculation means coupled to said filter means for calculating a function on the basis of a difference between a level of an output of said filter means and a predetermined reference level when the level of the output of said filter means is higher than a predetermined reference level;
delay means responsive to said input signal to delay said input signal by a predetermined time period; and processing means coupled to said calculation means and said delay means for processing an output of said delay means in accordance with an output of said calculation means, to produce an output of said system.

5. A system as claimed in claim 4, wherein said processing means includes an amplifier for amplifying the output of said delay means by a predetermined gain coefficient.

6. A digital signal processing system comprising:
a central processing unit (CPU); and
at least one digital signal processor (DSP), controlled by said CPU, which operates periodically synchronized with a sampling frequency of an input signal, wherein said DSP includes:
memory means for storing a plurality of predetermined parameters;
processing means coupled to said memory means for processing the input signal in accordance with said plurality of parameters stored in said memory means, to produce an output of said system;
buffer means coupled to said memory means and said processing means; and
control means coupled to said buffer means for transferring, during a predetermined time period of said sampling frequency, a plurality of new parameters to be temporarily stored in said buffer means when said parameters stored in said memory means are changed to said new parameters, said new parameters being supplied to said memory means, some of said new parameters being further supplied to said processing means which in turn performs the processing of the input signal in accordance with said new parameters.

7. A system as claimed in claim 6, wherein said processing means includes:
rectifying means for rectifying said input signal and setting at least a release time period with respect to said input signal;
first calculation means for calculating a level control signal on the basis of an output of said rectifying means when a level of the output of said rectifying means is higher than a predetermined reference level; and
second calculation means coupled to said first calculation means for processing said input signal in accordance with said level control signal of said first calculation means.

8. A digital signal processing system comprising:
a central processing unit (CPU); and
at least one digital signal processor (DSP) controlled by said CPU, wherein said DSP includes:
detection means for detecting a level of an input signal inputted through an input terminal of said system;
comparison means coupled to said detection means for comparing the detected level of said input signal with a predetermined reference level;
calculated means coupled to said detection means and said comparison means for calculating a function on the basis of a difference between the detected input signal level and said predetermined reference level when the detected input signal level is higher than said predetermined reference level and for dividing the calculated function by the detected input signal level to thereby produce an output;
difference calculating means responsive to the output of said calculation means for obtaining a difference between the output of said calculation means and a second predetermined gain coefficient to output the obtained difference therebetween; and multiplication means coupled to said input terminal and said difference calculating means for multiplying the obtained difference output by said difference calculating means by said input signal, to produce an output of said system.

9. A digital signal processing system comprising:
a central processing unit (CPU); and
at least one digital signal processor (DSP) controlled by said CPU, wherein said DSP includes:
detection means for detecting a level of an input signal inputted through an input terminal of said system;
comparison means coupled to said detection means for comparing the detected level of said input signal with a predetermined reference level;
calculated means coupled to said detection means and said comparison means for calculating a function on the basis of a difference between the detected input signal level and said predetermined reference level when the detected input signal level is higher than said predetermined reference level and for dividing the calculated function by the detected input signal level to thereby produce an output;
difference calculating means responsive to the output of said calculation means for obtaining a difference between the output of said calculation means and a second predetermined gain coefficient to output the obtained difference therebetween; and
multiplication means coupled to said input terminal and said difference calculating means for multiplying said input signal by the obtained difference output by said difference calculating means and a second predetermined gain coefficient, to produce an output of said system.

10. A digital signal processing system comprising:
a central processing unit (CPU); and
at least one digital signal processor (DSP) controlled by said CPU, wherein said DSP includes:
detection means for detecting a level of an input signal inputted through an input terminal of said system;
comparison means coupled to said detection means for comparing the detected level of said input signal with a predetermined reference level;
calculated means coupled to said detection means and said comparison means for calculating a function on the basis of a difference between the detected input signal level and said predetermined reference level when the detected input signal level is higher than said predetermined reference level and for dividing the calculated function by the detected input signal level and for multiplying a result of the division by a first predetermined gain coefficient to thereby produce an output;
difference calculating means responsive to the output of said calculation means for obtaining a difference between the output of said calculation means and a second predetermined gain coefficient to output the obtained difference therebetween; and
amplification means coupled to said input terminal and said difference calculating means for amplifying said input signal in accordance with the obtained difference output by said difference calculating means, to produce an output of said system.

11. A digital signal processing system comprising:
a central processing unit (CPU); and
at least one digital signal processor (DSP) controlled by said CPU, wherein said DSP includes:
detection means for detecting a level of an input signal inputted through an input terminal of said system;
comparison means coupled to said detection means for comparing the detected level of said input signal with a predetermined reference level;
calculated means coupled to said detection means and said comparison means for calculating a function on the basis of a difference between the detected input signal level and said predetermined reference level when the detected input signal level is higher than said predetermined reference level and for dividing the calculated function by the detected input signal level to thereby produce an output;
difference calculating means responsive to the output of said calculation means for obtaining a difference between the output of said calculation means and a second predetermined gain coefficient to output the obtained difference therebetween;
multiplication means coupled to said difference calculating means for multiplying the obtained difference output by said difference calculating means by a second predetermined gain coefficient; and
amplification means coupled to said input terminal and said multiplication means for amplifying said input signal in accordance with an output of said multiplication means, to produce an output of said system.

* * * * *